United States Patent
Fan et al.

(10) Patent No.: US 7,424,619 B1
(45) Date of Patent: Sep. 9, 2008

(54) SYSTEM AND METHODS FOR ANOMALY DETECTION AND ADAPTIVE LEARNING

(75) Inventors: Wei Fan, New York, NY (US); Salvatore J. Stolfo, Ridgewood, NJ (US)

(73) Assignee: The Trustees of Columbia University in the city of New York, New York, NY (US)

( * ) Notice: Subject to any disclaimer, the term of this patent is extended or adjusted under 35 U.S.C. 154(b) by 854 days.

(21) Appl. No.: 10/269,694

(22) Filed: Oct. 11, 2002

Related U.S. Application Data

(60) Provisional application No. 60/339,952, filed on Dec. 13, 2001, provisional application No. 60/328,682, filed on Oct. 11, 2001.

(51) Int. Cl.
*G06F 11/30* (2006.01)
*G06F 11/00* (2006.01)
*G06F 17/30* (2006.01)
*H04L 9/32* (2006.01)
*H04L 12/56* (2006.01)
*H04L 12/26* (2006.01)
*H04L 12/24* (2006.01)
*G05B 13/02* (2006.01)

(52) U.S. Cl. .......................... 713/188; 726/22; 726/23
(58) Field of Classification Search .............. 726/22, 726/23; 713/188
See application file for complete search history.

(56) References Cited

U.S. PATENT DOCUMENTS

| 6,405,318 | B1 * | 6/2002 | Rowland | 726/22 |
| 6,597,777 | B1 * | 7/2003 | Ho | 379/133 |
| 6,735,703 | B1 * | 5/2004 | Kilpatrick et al. | 726/23 |
| 7,162,741 | B2 * | 1/2007 | Eskin et al. | 726/25 |
| 2003/0172167 | A1 * | 9/2003 | Judge et al. | 709/229 |

FOREIGN PATENT DOCUMENTS

WO    WO 2007006994 A2 *   1/2007

OTHER PUBLICATIONS

Yongguang Zhang, Wenke Lee, Yi-An Huang, "Intrusion Detection Techniques for Mobile Wireless Networks", Sep. 2003, Wireless Networks, vol. 9, Issue 5, pp. 545-556.*

(Continued)

*Primary Examiner*—Emmanuel L Moise
*Assistant Examiner*—Courtney D Fields
(74) *Attorney, Agent, or Firm*—Baker Botts LLP

(57) ABSTRACT

In a method of generating an anomaly detection model for classifying activities of a computer system, using a training set of data corresponding to activity on the computer system, the training set comprising a plurality of instances of data having features, and wherein each feature in said plurality of features has a plurality of values. For a selected feature and a selected value of the selected feature, a quantity is determined which corresponds to the relative sparsity of such value. The quantity may correspond to the difference between the number of occurrences of the selected value and the number of occurrences of the most frequently occurring value. These instances are classified as anomaly and added to the training set of normal data to generate a rule set or other detection model.

20 Claims, 13 Drawing Sheets

OTHER PUBLICATIONS

Forrest et al., "A Sense of Self for UNIX Processes," *Proceedings of IEEE Symposium on Security and Privacy*, (1996) 120-128.

Anderson et al., "Next-generation Intrusion Detection Expert Systems (NIDES): A Summary," *Technical Report* SRI-CSL-95-07, *Computer Science Laboratory* (1995).

Lippman et al., MIT Lincoln Laboratory "1998 Intrusion Detection Evaluation" (1998).

Cohen, :Fast Effective Rule Induction, *Proceedings of Machine Learning: Proceedings of Twelfth International Conference*, (1995).

Lee, *A Data Mining Framework for Constructing Features and Models for Intrusion Detection Systems*, Ph.D. Thesis, Columbia University, (1999).

* cited by examiner

US 7,424,619 B1

SYSTEM AND METHODS FOR ANOMALY DETECTION AND ADAPTIVE LEARNING

CROSS-REFERENCE TO RELATED APPLICATIONS

This application claims the benefit of U.S. Provisional Patent Application Ser. Nos. 60/339,952, filed on Dec. 13, 2001, entitled "Method and Apparatus for Detecting of Intrusion into Computer Systems by Combining Multiple Models" and 60/328,682, filed on Oct. 11, 2001, entitled "Method and Apparatus for Combining Multiple Models for Intrusion Detection System," which are hereby incorporated by reference in their entirety herein.

STATEMENT OF GOVERNMENT RIGHT

This invention was made with government support under grant nos. F30602-00-1-0603 and NCSU 00-3341-02 awarded by the United States Defense Advanced Research Projects Agency (DARPA). The government has certain rights in the invention.

COMPUTER PROGRAM LISTING

A computer program listing is submitted in duplicate on CD. Each CD contains a routine curveNoise_main.c, which is 7.428 kB in size. The CD was created on Oct. 11, 2002. Additional supporting files are listed in the Appendix. The files on this CD are incorporated by reference in their entirety herein. The two compact discs submitted are identical.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to methods of intrusion detection in a computer system, and more particularly, to techniques for generating intrusion detection models by artificially creating instances of data on a computer system.

2. Background Information

Many information survival systems, such as intrusion detection systems (IDSs) and credit card fraud detection systems, must be capable of detecting new and unknown patterns, or anomalies. At the same time, they must be able to efficiently adapt existing models when knowledge about new patterns becomes available.

Exemplary, novel techniques for intrusion detection are described in co-pending U.S. application Ser. No. 10/208,402 filed Jul. 30, 2002, entitled "System and Methods For Intrusion Detection With Dynamic Window Sizes," U.S. application Ser. No. 10/208,432 filed Jul. 30, 2002, entitled "System and Methods For Detection of New Malicious Executables," and U.S. application Ser. No. 10/222,632 filed Aug. 16, 2002, entitled "System and Methods For Detecting Malicious Email Transmission," each of which is incorporated by reference in its entirety herein.

Data analysis tasks can be broadly categorized into anomaly detection and classification problems. "Anomaly detection" tracks events that are inconsistent with or deviate from events that are known or expected. For example, in anomaly detection systems are designed to flag observed activities that deviate significantly from established normal usage profiles. On the other hand, "classification systems" use patterns of well-known classes to match and identify known labels for unlabeled datasets. In intrusion detection, classification of known attacks is also called "misuse detection." By definition, anomalies are not known in advance. Otherwise, they might be treated as a classification problem. Classification solves the problem of effectively learning from experience; however, anomaly detection discovers new knowledge and experience that may be used by classification after these anomalies are verified and established as new classes.

Anomaly detection systems are not as well studied, explored, or applied as classification systems. For IDSs, the DARPA evaluation results (further details are disclosed in MIT Lincoln Lab 1999, "1998 DARPA Intrusion Detection Evaluation, on line publication, http://www.ll.mit.edu/IST/ideval/index.html), one of the most authoritative competitions, showed that even the best IDSs fail to detect a large number of new and unknown intrusions. As new intrusion prevention and detection systems are deployed, it is expected that new attacks may be developed and launched. Misuse detection, or classification models, has limitations because it can only detect known attacks and their slight variations accurately, In the current generation of classification models, training data containing instances of known classes is often available for training (or human analysis) and the goal is simply to detect instances of these known classes. Anomaly detection, however, relies on data belonging to one single class (such as purely "normal" connection records) or limited instances of some known classes with the goal of detecting all unknown classes. It may be difficult to use traditional inductive learning algorithms for such a task, as most are only good at distinguishing the boundaries among all given classes of data.

A major difficulty in using machine learning methods for anomaly detection lies in making the learner discover boundaries between known and unknown classes. Since the process of machine learning typically begins without any examples of anomalies in the training data (by definition of anomaly), a machine learning algorithm will only uncover boundaries that separate different known classes in the training data. This behavior is intended to prevent overfitting a model to the training data. Learners only generate hypotheses for the provided class labels in the training data. These hypotheses define decision boundaries that separate the given class labels for the sake of generality. They will not specify a boundary beyond what is necessary to separate known classes.

Some learners can generate a default classification for instances that are not covered by the learned hypothesis. The label of this default classification is often defined to be the most frequently occurring class of all uncovered instances in the training data. It is possible to modify this default prediction to be anomaly, signifying that any uncovered instance should be considered anomalous. It is also possible to tune the parameters of some learners to coerce them into learning more specific hypotheses. These methods typically do not yield a reasonable performance level.

Past research in anomaly detection in the intrusion detection domain has tended to focus on modeling user or program activities on a single host. For example, NIDES (Anderson, D. et al., "Next-Generation Intrusion Detection Expert System (NIDES): A Summary," *Technical Report* SRI-CSL-95-07, *Computer Science Laboratory*, SRI International, Menlo Park, 1995) uses a number of statistical measures to construct user profiles. Forrest et al. (Forrest, S. et al., "A Sense of Self for UNIX Processes," Proceedings of IEEE Symposium on Security and Privacy 1996) used short sequences of system calls made by programs to build normal profiles of process execution. However, many network-based attacks, e.g., the recent Distributed Denial of Service attacks on various Web sites, do not involve users or system programs on the victim hosts, and thus render anomaly detection models based on user and program activities less effective.

Therefore there is a need to develop anomaly detection models for classification of network activities and to classify previously unknown anomalies.

SUMMARY OF THE INVENTION

It is an object of the invention to provide effective defense against newly developed intrusions while maintaining the ability to detect known intrusions.

It is a further object of the invention to generate anomalies in regions that correspond to the boundaries between known and unknown classes of data.

These and other objects of the invention, which will become apparent with reference to the disclosure herein, are accomplished by a method of generating an anomaly detection model for classifying of activities of a computer system, using a training set of data corresponding to activity on the computer system, the training set comprising a plurality of instances of data having features, wherein each feature in said plurality of features has a plurality of values. The data corresponding to activity of the computer system typically refers to "normal" activity, e.g., authorized activity, on the computer system.

For a selected feature of the plurality of features, an early stage is determining a quantity corresponding to the relative sparsity of the selected value. This step may comprise determining a number of occurrences of a most frequently occurring value of the selected feature. For a selected value of the plurality of values, a number of occurrences of the selected value is determined. The difference between the number of occurrences of the most frequently occurring value of the selected feature and the number of occurrences of the selected value is determined. Clearly, if there are few occurrences of the selected feature value, then the difference between these two values will be significant.

A next step is to generate, for a number of iterations corresponding to the difference determined above, a plurality of instances of data. These instances of data which are generated herein may be classified as anomalies. The instances of data generated in the above step are added to the training set of data corresponding to normal activity.

Advantageously, the step of generating a plurality of instances of data may comprise randomly selecting an instance from the training data, and determining a value of a feature corresponding to the randomly selected instance. A further step may comprise replacing the value of the feature corresponding to the randomly selected instance with a randomly selected value, in which the randomly selected value excludes the value of the feature corresponding to randomly selected instance and the selected value. A further step in the method may comprise generating an instance of data from the randomly selected value.

According to another embodiment, a "pure anomaly detection" model may be generated. The method may further comprise generating a intrusion detection model from the training set. The step of generating an intrusion detection model may comprise using the RIPPER algorithm. The step of generating an intrusion detection model may comprise generating a plurality of unordered or ordered rulesets.

A "combined misuse and anomaly detection" model may be generated according to yet another embodiment. For this embodiment, after the first set of instances are generated, and added to the training set, and an intrusion detection model is generated, a second selected feature may be used to generate instances of data. For the second selected feature in the plurality of features, a further step may comprise determining a number of occurrences of a most frequently occurring value of the second selected feature. For a selected value in the plurality of values, a number of occurrences of the selected value may be determined. A subsequent step may include generating, for a number of iterations corresponding to the difference between the number occurrences of the selected value and the number of occurrences of the most frequently occurring value, a plurality of instances of data. These instances are added to the training set. According to this embodiment, the second selected feature may comprises a cluster of features.

In accordance with the invention, the objects described above have been met, and the need is the art for a technique of modeling an intrusion detection model that classifies previously unknown anomalies has been satisfied.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
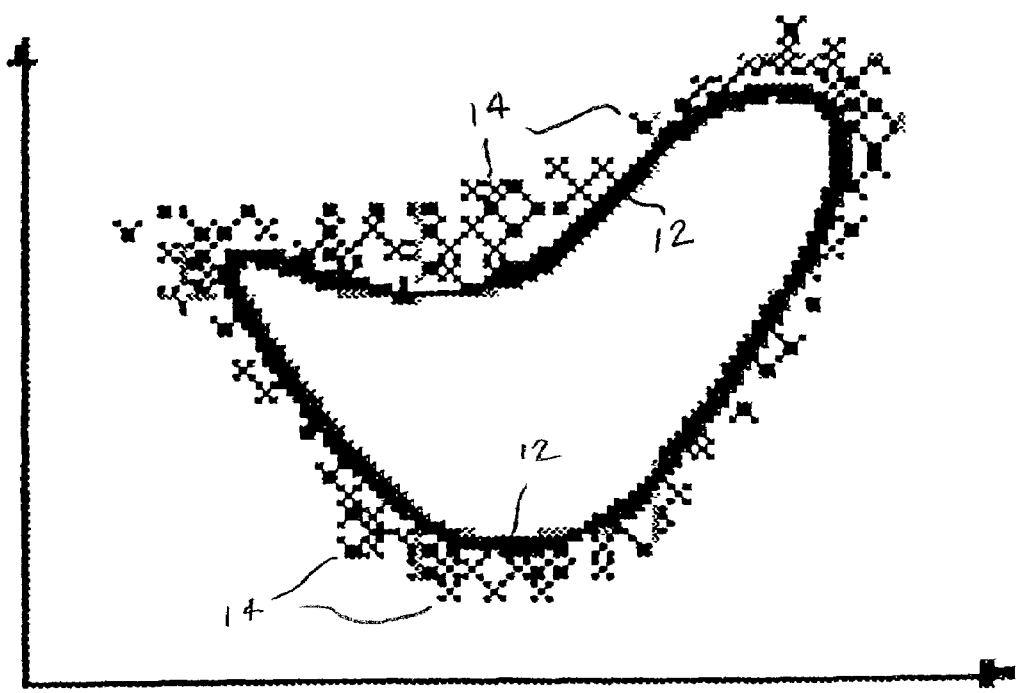
FIG. 1 is a plot representing a cluster of values of features in a training set in accordance with the invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF EXEMPLARY EMBODIMENTS

This invention will be further understood in view of the following detailed description.

In order to overcome the limitations of misuse detection models which use more specific hypotheses and modify a model's default prediction, novel techniques for artificial anomaly generation are described herein. Artificial anomalies are computed instances of data that are different from the behavior of the training data. Artificial anomalies are added into the training data to help the learner (which may be an inductive learner, e.g., a program that learns a function to map a set of feature values to a predicted feature value. It can be a decision tree, rule learner (such as RIPPER) or naives Bayes among others) discover a boundary around the original data. A "boundary" is a function that differentiates the original data from the anomalies. In accordance with the invention, all artificial anomalies are given the class label anomaly. The generation of artificial anomalies focuses on "near misses," i.e., those instances of features that are close to the known data, but are not in the training data. In training the machine learner, it is assumed that the training data are representative of normal instances, hence near misses are taken to be anomalous. The artificial anomaly generation methods described herein are independent of the learning algorithm, as the anomalies are merely added to the training data.

One embodiment for generating artificial anomalies is to produce random instances (e.g., a data instance or a data item) that span the complete domain defined by all features. (Each feature has some valid values. The Cartesian product of every feature value of all features is the domain of features.) A value for each feature is chosen randomly from the definition domain of that feature. The artificial anomalies produced will be uniformly distributed across the domain defined by all features. If instances of known classes are clustered into small areas of that domain, and a sufficient amount of artificial anomalies is produced, the learner may be able to uncover the boundary between known and unknown classes as it tries to separate known classes from artificial anomalies. The domain of the decision space, the complexity of the target decision boundary, the amount of known data, and the amount of artificial anomalies produced are factors contributing to the effectiveness of this approach.

Another embodiment of the novel technique is to generate artificial anomalies that are based on the known data. At this stage, the exact decision boundary between known instances and anomalous instances is not known. However, the technique includes an assumption that the boundary may be very close to the existing data. To generate artificial anomalies close to the known data, a useful heuristic used herein is to randomly change the value of one feature of an example while leaving the other features unaltered.

An example of such data is illustrated in FIG. 1. Some regions are densely populated, as indicated by the region 12 (represented by a darker area). Some regions 14 of known data in the instance space may be sparsely populated (represented by spaced-apart data points). Sparsely populated regions may be considered analogous to small "islands" in an ocean, and dense regions may be considered analogous to large "islands" in such ocean. To avoid overfitting, learning algorithms are usually biased towards discovering more general hypotheses. Since only known data is available, it is typically desirable to prevent hypotheses from being overly general when predicting these known classes. That is, sparse regions may be grouped into dense regions to produce singularly large regions covered by overly general hypotheses. Using the analogy above, small "islands" are unnecessarily grouped by these procedures into large "islands" to form apparently larger "islands." The novel technique described herein produces artificial anomalies around the edges of these sparse regions and coerces the learning algorithm to discover the specific boundaries that distinguish these regions from the rest of the instance space. In other words, the novel method described below generates data that will amplify these sparse regions.

Sparse regions are characterized by infrequent values of individual features. To amplify sparse regions, the method proportionally generates more artificial anomalies around sparse regions. This approach is also presented in FIG. 2 as technique 100. Further details are provided in the Appendix and in the software code appended hereto, which is incorporated by reference in its entirety herein. The first step 102 is loading the input D, which represents training data. At step 104, the set F is initialized which represents all features f of D. The output D' is initially taken to be an empty set.

As discussed above, the value of one feature of an example is randomly changed while leaving the other features unaltered. (In one embodiment, all features (first and subsequent) may be selected at random, for example.) Thus, at step 106, a first feature f is selected. For each feature f, there is a set of all features $V_f$ (step 108). At step 110, $countV_{max}$ is selected as the number of occurrences of the most frequently occurring value v in $V_f$. The method 100 may include selecting one value v in $V_f$ at step 112. The relative sparsity of the selected value v with respect to the other values is determined. For example, the number of occurrences of the selected value v, countV, is calculated at step 114. The difference between $countV_{max}$ and countV, is calculated. Thus, the greater the difference between $countV_{max}$ and countV the more sparse is the region associated with this selected value v (the value of this feature is infrequently present in the data set), and consequently, the more artificial anomalies are to be generated by this method. A next step is to establish a loop in order to randomly sample data points from the training set, (step 116). The number of iterations in the loop corresponds to the difference $countV_{max}$–countV, calculated above. Each data point d from the training set is randomly sampled at step 118, and is associated with a value $v_f$ for the selected feature f of data point d is determined at step 120. At step 122, $v_f$, the value of feature f, is replaced with any v' such that v'≠v ^ v'≠$v_f$ to generate an artificial anomaly, d'. This artificial anomaly d' is then added to the output D' at step 124. In other words, the artificial anomaly d' is classified as anomaly and added to the training set of normal data. After completing the loop defined by steps 116-124, the method may generate a ruleset with a learning algorithm based on the training set augmented by the artificial anomalies (step 128). The learning algorithm used will then specifically cover all instances of the data with value v for feature f. The algorithm can be modified to take a factor, n, and produce n×|D| artificial anomalies, as will discussed below.

The method may continue with another value of the feature, or cluster of features, as will be described below. If so (step 130), the next value is considered, and the method may continue with step 106. (If no further features are used, this portion of the method is completed.) This anomaly generation process is called distribution-based artificial anomaly generation (or "DBA2"), as the distribution of a feature's values across the training data is used to selectively generate artificial anomalies.

In the above discussion, it is assumed that the artificial anomalies do not intersect with any known data. In the DARPA dataset, there are 41 features. A few of these features are Boolean, but most of them are either continuous or contain more than five discrete values. Since the total size of the training data is significantly smaller than $2^{41}$ (the lower bound of the feature domain), the chance of intersection is very small. It is possible check for collision with known instances, but this may be a very expensive process. An exemplary approach is to filter artificial anomalies with hypotheses learned on the original data. By this approach, the training set is used, along with an initial generation of artificial anomalies generated by method 100, above, to learn a model. This model is then evaluated over previously generated artificial anomalies and any anomalies which are classified as some known class. This process is repeated until the size of the set of artificial anomalies remains relatively consistent.

EXAMPLE

For generation of the models in the exemplary embodiment, RIPPER, an inductive decision tree learner, is used. (RIPPER, a rule induction algorithm, is described in W. W. Cohen. "Fast Effective Rule Induction," *Machine Learning: the 12th International Conference*, Lake Taho, Calif., 1995. Morgan Kaufmann, which is incorporated by reference in its entirety herein.) RIPPER can learn both unordered and ordered rulesets. In all results illustrated herein, unless clearly stated, an unordered RIPPER ruleset is used, and an amount of distribution-based artificial anomalies (generated by method 100, above) equal to the size of the training set are added into the training set. The experiments used data distributed by the 1998 DARPA Intrusion Detection Evaluation Program, which was conducted by MIT Lincoln Lab (available from the UCI KDD repository as the 1999 KDD Cup Dataset, which is incorporated by reference in its entirety herein.) The taxonomy for categorization of intrusions that was used by the DARPA evaluation is also used herein. This taxonomy places intrusions into one of four categories: denial of service (DOS), probing (PRB), remotely gaining illegal remote access to a local account or service (R2L), and local user gaining illegal root access (U2R). The type of intrusions are represented in Table 1. The DARPA data were gathered from a simulated military network and includes a wide variety of intrusions injected into the network over a period of seven weeks. The data were then processed into connection records using MADAM ID, as described in Wenke Lee, *A Data Mining Framework for Constructing Features and Models for Intrusion Detection Systems*, Ph.D. Thesis, Columbia University, June 1999. A 10% sample was taken which maintained the same distribution of intrusions and normal connections as the original data. A portion of this data—80%—was used as training data, and the remaining portion—20%—was unaltered to be used as test data for evaluation of learned models.

For pure anomaly detection, a model was learned consisting of only normal connections augmented by artificial anomalies generated by method 100 above from these normal connections. The instances generated at step 122 are classified as anomaly. (In the exemplary embodiment, it is determined at step 130 of FIG. 1 that no further features are to be evaluated.) This collection is referred to as dataset$_o$. RIPPER learns a large number of rules for both normal and anomaly from this dataset. The method 100 described above is performed on a computer such as personal computer, using the computing language C, or any other similar computing language.

Tables 2(a) and 2(b) show the results of the pure anomaly detection model. The detection rate and false alarm rate have been measured to evaluate performance. This terminology is commonly used in the intrusion detection community. Anomaly detection rate, or percentage of occurrences of some unknown intrusion i that are detected as anomalies, is defined as $$\% \ a_i = \frac{|A \cap Wi|}{|Wi|} \times 100\%,$$

where A is the set of all predicted anomalies and $W_i$ is the set of occurrences of label i in the dataset. The subscript i is omitted where the meaning is clear from context. Similarly, cumulative anomaly detection rate is calculated over all unknown intrusions (% $a_{ttl}$) and cumulative anomaly detection rate over different categories of unknown intrusions (such as % $a_{u2r}$). Also, the false alarm rate (% far) of anomalous classifications is measured. This is the percentage of predicted anomalies that are normal connections, and is defined as $$\% \ far = \frac{|A \cap W_{normal}|}{|A|} \times 100\%.$$

If a measurement has a value of 0, we represent it with "-" to enhance readability of the presented tables.

TABLE 2(a)

| | |
|---|---|
| % $a_{ttl}$ | 94.26 |
| % far | 2.02 |

TABLE 2(b)

| | % a | | % a | | % a | | % a |
|---|---|---|---|---|---|---|---|
| buffer_overflow | 100.00✓ | ftp_write | 50✓ | back | 100.00✓ | ipsweep | — |
| loadmodule | 66.67✓ | guess passwd | 100.00✓ | land | 75.00✓ | nmap | — |
| multihop | 57.14✓ | imap | 83.33✓ | neptune | 80.52✓ | portsweep | 4.81 |
| perl | — | phf | 100.00✓ | pod | 9.62 | satan | 0.32 |
| rootkit | 10.00 | spy | — | smurf | 99.94✓ | | |
| | | warezclient | 64.25✓ | teardrop | — | | |
| | | warezmaster | 80.00✓ | | | | |
| U2R | 47.06✓ | R2L | 66.67✓ | DOS | 94.31✓ | PRB | 1.34 |

✓: significant or % a ≥ 50%

The cumulative anomaly detection rate over all intrusions and false alarm rates are shown in Table 2(a). The anomaly detection model successfully detects 94.26% of all anomalous connections in the test data and has a false alarm rate of 2.02%. To examine the performance for specific intrusion classes and categories, the anomaly detection rate (% a) for each class and category is shown in Table 2(b). The anomaly detection model is capable of detecting most intrusion classes, even though there are no intrusions at all in the training set. A total of 17 out of 22 intrusion classes (all non-null measurements) are detected as anomalies. For 13 out of 22 intrusions (all entries highlighted by √), the proposed method catches at least 50% of all occurrences. There are three intrusions (guess_passwd, buffer_overflow and phf) that our approach is capable of detecting perfectly (i.e., % a=100%). These three intrusions belong to the more harmful U2R and R2L categories. The anomaly detection rates of all four categories of intrusions indicate that, in general, each category is successfully detected. In three out of four categories (U2R, R2L, and DOS), the model detects more than 50% of all intrusion occurrences of that category, and it is important to note that these three categories are potentially more damaging than PRB.

In another embodiment, a single ruleset may be learned for combined misuse and anomaly detection. The ruleset has rules to classify a connection as normal, one of the known intrusion classes, or anomaly. In order to evaluate this combined approach, intrusions are grouped together into a number of small clusters as shown in Table 3. Datasets are created (dataset$_i$, $1 \leq i \leq 12$) by incrementally adding each cluster, into the normal dataset and re-generating artificial anomalies. (In the exemplary embodiment illustrated at FIG. 2, step 130 would indicate that further clusters of features are to be evaluated.) This is to simulate the real world process of experiencing new intrusions, and incorporating them into the training set. Models are learned that contain misuse rules for the intrusions that are "known" in the training data, anomaly detection rules for unknown intrusions in left-out clusters, and rules that characterize normal behavior.

TABLE 3

| 1 | 2 | 3 | 4 | 5 | 6 |
|---|---|---|---|---|---|
| back | buffer-overflow<br>loadmodule<br>perl<br>rootkit | ftp_write<br>warezclient<br>warezmaster | guess_passwd | imap | land |

| 7 | 8 | 9 | 10 | 11 | 12 | 13 |
|---|---|---|---|---|---|---|
| portsweep<br>satan | ipsweep<br>nmap | multihop | neptune | phf | pod<br>teardrop | spy<br>smurf |

Each cluster contains intrusions that require similar features for effective detection. Clusters should not be confused with the attack categories in the taxonomy of Table 1. One example of a cluster contains the following intrusions: buffer_overflow, loadmodule, perl and rootkit. These intrusions all attempt to gain unauthorized root access to a local machine and require features such as root_shell (whether a root shell is obtained) and su_flag (an indication of whether the su root command has been used, or any of its derivations). Some clusters have completely disjoint feature sets, yet some intersect slightly.

Some frequently used terms are defined herein. Any intrusion class that appears in the training data is a "known intrusion." Similarly, any intrusion class not in the training set is an "unknown intrusion," or a "true anomaly." "Predicted anomalies" include true anomalies and may also include instances of known intrusions and normal. The term "anomaly" refers to "predicted anomaly" where such meaning is clear from context.

Figure 2:
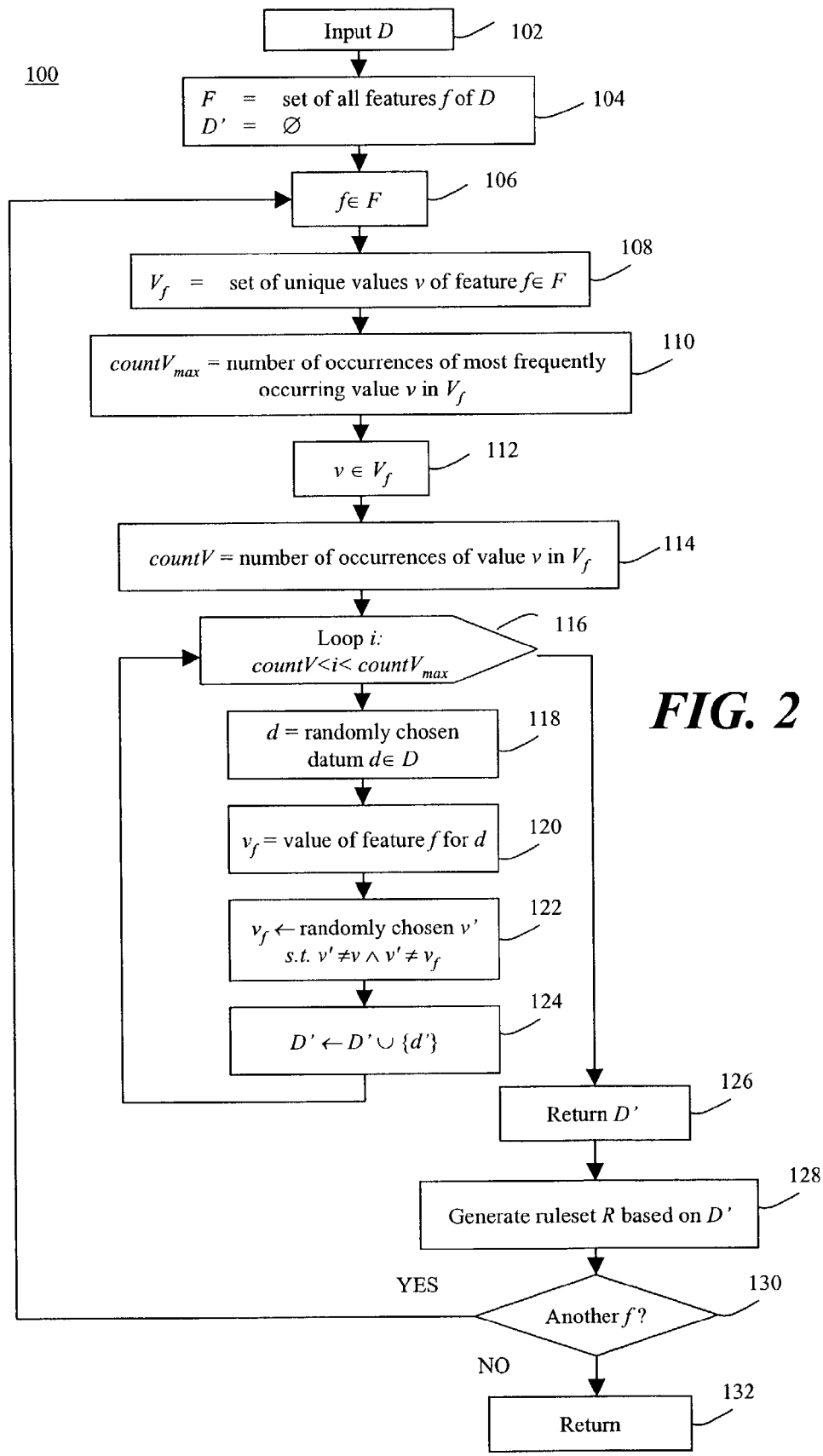
FIG. 2 is a flow chart representing the process in accordance with the present invention.
Figure 2A:
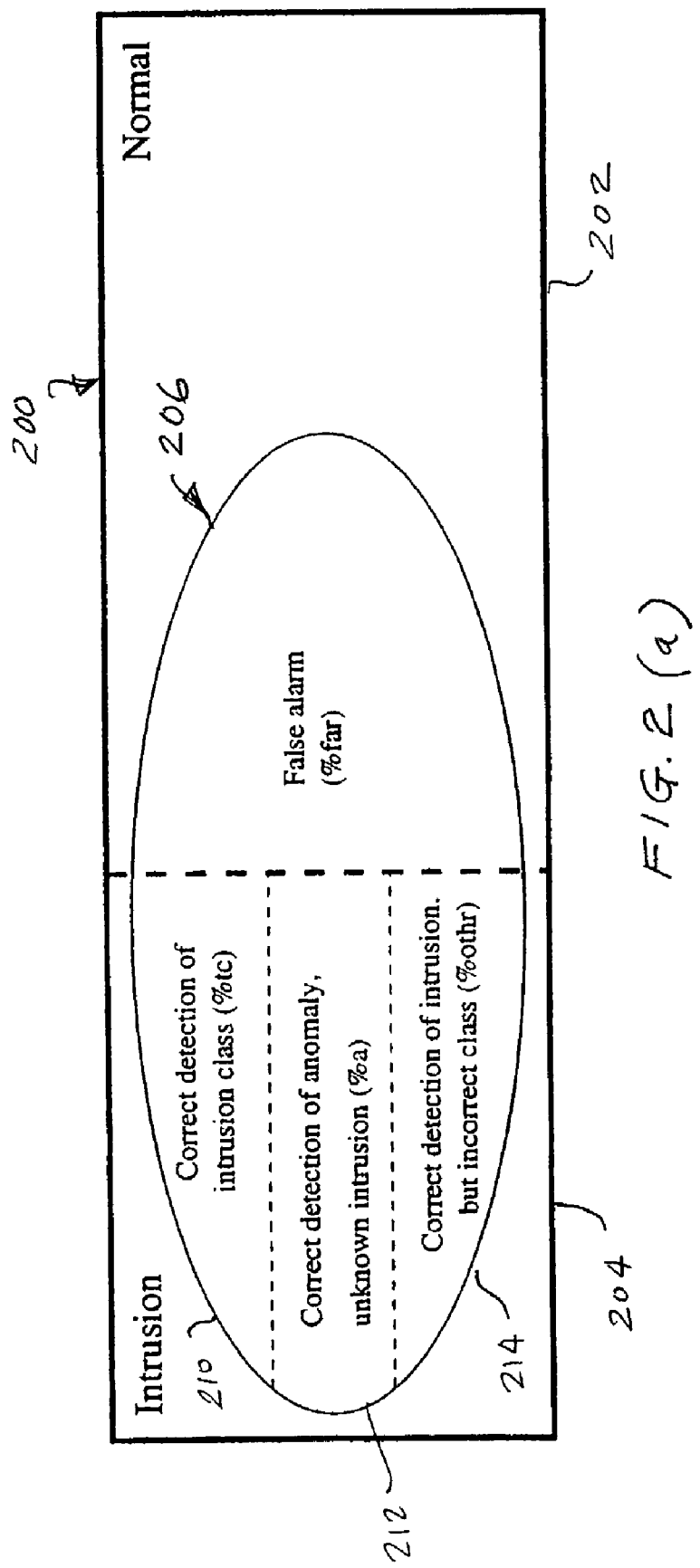
FIG. 2(a) is a chart of classifications of data determined by testing the process in accordance with the invention.

Based on the outcome of detection, the following measurements were calculated: true class detection rate (% tc), anomaly detection rate (% a), and other class detection rate (% othr). The relationship of these metrics is shown in FIG. 2($a$). The outside rectangle 200 represents the set of data to be evaluated. Normal behavior 202 and intrusions 204 are indicated on opposite sides of the dashed line. The inside ellipse 206 depicts the set of alarms generated by our learned detection models. True class detection rate 210 measures the percentage of connection class i (normal or intrusions) being correctly predicted as its true class, and is defined as $$\% \ tc = \frac{|P_i \cap W_i|}{|W_i|} \times 100\%,$$

where $P_i$ is the set of predictions with label i. The indication na (or not available) is used in Tables 4-6, below, if the value of % tc is undefined, which is the case when an intrusion was not included in the training data. Anomaly detection rate 212 % a is defined above, but it can be measured for both known and unknown intrusions or intrusion categories that are predicted as anomalies. Other class detection rate 214, or the rate of detection as another class of intrusion, is the percentage of occurrences of intrusion i that are detected as some class of intrusion other than its true label or anomaly, and is defined as $$\% \ othr = \frac{\sum_{i'} \neq |P_{i'} \cap W_i|}{|W_i|} \times 100\%.$$

Additionally, total detection rate is defined as % ttl=% tc+% a+% othr.

The results are shown in Tables 4-6, and are analyzed from several perspectives. First, the proposed method influences the true class detection rate (% tc) of known intrusions. Ideally, using artificial anomalies should allow anomaly detection to classify true anomalies without degrading the performance of detecting known intrusions with misuse rules. Second, the effectiveness of detecting true anomalies is evaluated. Third, it is examined whether anomalous classification can compensate for low detection rates of misuse rules over known intrusions. Finally, false alarm rates are shown of anomaly detection in different test settings.

Figure 3:
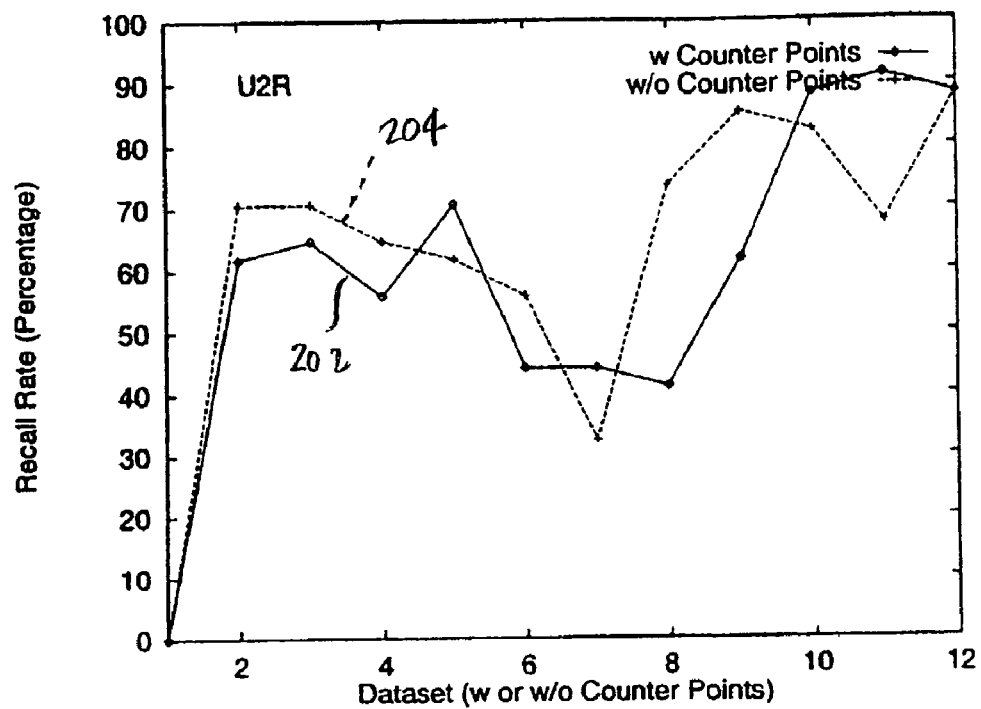
FIG. 3 is plot representing the true class detection rate for U2R intrusions in accordance with the present invention.

The true class detection rates of models learned with and without method 100 (also referred to as "DBA2") are shown in FIGS. 3-6. The curves 310 and 320 for R2L, in which the curve 310 generated with method 100 is illustrated in solid line and curve 320 generated without method 100 is illustrated in dashed line (illustrated in FIG. 4), DOS curves 320 (with method 100) and 322 (without method 100) (illustrated in FIG. 5), and PRB curves 330 (with method 100) and 332 (without method 100) (illustrated in FIG. 6) are indistinguishable or completely identical. The difference in U2R curves 202 (with method 100) and 204 (without method 100), illustrated in FIG. 3, is reasonably small as well. (Note that there are only 34 U2R instances in the test data. Disagreements in just a few examples can result in a significant difference in % tc.) This observation shows that the proposed method 100 does not deteriorate the effectiveness of detecting particular categories of known intrusions.

The effectiveness of detecting true anomalies is shown in the second column of all sub-tables in Tables 4-6.

TABLE 4

| | dataset₁ | | | | dataset₂ | | | |
|---|---|---|---|---|---|---|---|---|
| | % tc | % a | % othr | % ttl | % tc | % a | % othr | % ttl |
| normal | 99.04 | 0.96 | na | na | 99.25 | 0.74 | na | na |
| back | 98.64 | 1.36 ○ | — | 100.00 | 98.64 | 1.36 ○ | — | 100.00 |
| buffer_overflow | na | 100.00✓ | — | 100.00 | 80.00 | 20.00 ○ | — | 100.00 |
| loadmodule | na | 77.78✓ | — | 77.78 | 77.78 | 22.22 ○ | — | 100.00 |
| perl | na | — | — | — | 100.00 | — | — | 100.00 |
| rootkit | na | 10.00 | — | 10.00 | 70.00 | — | — | 70.00 |
| ftp_write | na | 62.50✓ | — | 62.50 | na | 37.50 | — | 37.50 |
| warezclient | na | 69.08✓ | 0.97 | 70.05 | na | 32.37 | — | 32.37 |
| warezmaster | na | 80.00✓ | — | 80.00 | na | 100.00✓ | — | 100.00 |
| guess-passwd | na | 100.00✓ | — | 100.00 | na | 90.91✓ | — | 90.91 |
| imap | na | 83.33✓ | — | 83.33 | na | 100.00✓ | — | 100.00 |
| land | na | — | — | — | na | 50.00✓ | — | 50.00 |
| portsweep | na | 69.23 | — | 69.23 | na | 69.23✓ | — | 69.23 |
| satan | na | 12.97 | — | 12.97 | na | 17.09 | — | 17.09 |
| ipsweep | na | 20.16 | — | 20.16 | na | 46.37✓ | — | 46.37 |
| nmap | na | 73.91✓ | — | 73.91 | na | 80.43✓ | — | 80.43 |
| multihop | na | 71.43✓ | — | 71.43 | na | 71.43✓ | 28.57 | 100.00 |
| neptune | na | 94.50✓ | — | 94.50 | na | 98.39✓ | — | 98.39 |
| phf | na | 100.00✓ | — | 100.00 | na | 100.00✓ | — | 100.00 |
| pod | na | 94.23✓ | — | 94.23 | na | 100.00✓ | — | 100.00 |
| teardrop | na | 61.93✓ | — | 61.93 | na | 90.86✓ | — | 90.86 |
| spy | na | — | — | — | na | 50.00✓ | — | 50.00 |
| smurf | na | 81.21✓ | — | 81.21 | na | 100.00✓ | — | 100.00 |
| U2R | na | 52.94✓ | — | 52.99 | 61.76 | 23.53 | 5.88 | 91.18 |
| R2L | na | 71.08✓ | 0.80 | 71.89 | na | 40.96✓ | — | 40.96 |
| DOS | 0.56 | 89.35✓ | — | 84.91 | 0.56 | 98.98✓ | — | 99.53 |
| PRB | na | 32.89 | — | 32.89 | na | 42.79✓ | — | 42.79 |
| % far | | 0.28 | | | | 0.18 | | |

| | dataset₃ | | | | dataset₄ | | | |
|---|---|---|---|---|---|---|---|---|
| | % tc | % a | % othr | % ttl | % tc | % a | % othr | % ttl |
| normal | 99.18 | 0.80 | na | na | 98.94 | 1.04 | na | na |
| back | 98.41 | 1.59 ○ | — | 100.00 | 98.87 | 1.13 ○ | — | 100.00 |
| buffer_overflow | 60.00 | 40.00 ○ | — | 100.00 | 60.00 | 40.00 ○ | — | 100.00 |
| loadmodule | 88.89 | 11.11 ○ | — | 100.00 | 77.78 | 22.22 ○ | — | 100.00 |
| perl | 100.00 | — | — | 100.00 | 100.00✓ | — | — | 100.00 |
| rootkit | 80.00 | — | — | 80.00 | 60.00 | — | 10.00 | 70.00 |
| ftp_write | 100.00 | — | — | 100.00 | 100.00 | — | — | 100.00 |
| warezclient | 94.69 | 1.45 | — | 96.14 | 94.69 | 2.90 | — | 97.58 |
| warezmaster | 60.00 | — | 20.00 | 80.00 | 60.00 | 20.00 ○ | 20.00 | 100.00 |
| guess-passwd | na | 90.91✓ | — | 90.91 | 90.91 | 9.09 ○ | — | 100.00 |
| imap | na | 100.00✓ | — | 100.00 | na | 91.67✓ | — | 91.67 |
| land | na | 25.00 | — | 25.00 | na | 75.00✓ | — | 75.00 |
| portsweep | na | 69.23✓ | — | 69.23 | na | — | — | — |
| satan | na | 11.71 | — | 11.71 | na | — | — | — |
| ipsweep | na | 53.63✓ | — | 53.63 | na | 61.29✓ | — | 61.29 |
| nmap | na | 93.48✓ | — | 93.48 | na | 45.65 | — | 45.65 |
| multihop | na | 28.57 | 71.43 | 100.00 | na | 57.14✓ | 42.86 | 100.00 |
| neptune | na | 94.48✓ | — | 94.48 | na | 0.27 | — | 0.27 |
| phf | na | 100.00✓ | — | 100.00 | na | 50.00✓ | — | 50.00 |
| pod | na | 100.00✓ | — | 100.00 | na | 94.23✓ | — | 94.23 |
| teardrop | na | — | — | — | na | 35.53 | — | 35.53 |

TABLE 4-continued

| | | | | | | | | |
|---|---|---|---|---|---|---|---|---|
| spy | na | 50.00✓ | — | 50.00 | na | 50.00✓ | — | 50.00 |
| smurf | na | 100.00✓ | — | 100.00 | na | 100.00✓ | — | 100.00 |
| U2R | 64.71 | 14.71 | 14.71 | 94.12 | 55.88 | 23.53 | 11.76 | 91.18 |
| R2L | 83.13 | 12.05 | 0.40 | 95.58 | 87.15 | 8.84 | 0.40 | 96.39 |
| DOS | 0.55 | 97.68✓ | — | 98.23 | 0.56 | 71.97✓ | — | 72.52 |
| PRB | na | 43.64✓ | — | 43.64 | na | 21.15 | — | 21.15 |
| % far | | | 0.20 | | | | 0.18 | |

$dataset_i$: normal + $cluster_{1-t}$ + DBA2-generated anomalies from (normal + $cluster_{1-t}$)

✓: significant anomaly detection, or % a > 100%

○: significant compensation for misuse detection, or (% tc + % a ≅ 100% ∧ % tc < 100%) v (% a ≧ 0.25 × % tc)

TABLE 5

| | $dataset_5$ | | | | $dataset_6$ | | | |
|---|---|---|---|---|---|---|---|---|
| | % tc | % a | % othr | % ttl | % tc | % a | % othr | % ttl |
| normal | 98.86 | 1.13 | na | na | 98.84 | 1.15 | na | na |
| back | 98.64 | 1.36 ○ | — | 100.00 | 98.87 | 1.13 ○ | — | 100.00 |
| buffer_overflow | 60.00 | 20.00 ○ | 20.00 | 100.00 | 100.00 | — | — | 100.00 |
| loadmodule | 100.00 | — | — | 100.00 | 55.56 | 33.33 ○ | 11.11 | 100.00 |
| perl | 100.00 | — | — | 100.00 | 100.00 | — | — | 100.00 |
| rootkit | 90.00 | — | — | 90.00 | 20.00 | 60.00 ○ | — | 80.00 |
| ftp_write | 100.00 | — | — | 100.00 | 100.00 | — | — | 100.00 |
| warezclient | 96.14 | 2.90 ○ | — | 99.03 | 95.17 | 3.38 | — | 98.55 |
| warezmaster | 60.00 | 20.00 ○ | 20.00 | 100.00 | 60.00 | — | 20.00 | 80.00 |
| guess-passwd | 90.91 | — | 9.09 | 100.00 | 90.91 | 9.09 ○ | — | 100.00 |
| imap | 100.00 | — | — | 100.00 | 91.67 | 8.33 ○ | — | 100.00 |
| land | na | — | — | — | 50.00 | — | — | 50.00 |
| portsweep | na | 72.60✓ | — | 72.60 | na | 94.71✓ | — | 94.71 |
| satan | na | 89.56✓ | — | 89.56 | na | 24.37 | — | 24.37 |
| ipsweep | na | 60.48✓ | — | 60.48 | na | 64.11✓ | — | 64.11 |
| nmap | na | 80.43✓ | — | 80.43 | na | 91.30✓ | — | 91.30 |
| multihop | na | 57.14✓ | 14.29 | 71.43 | na | 42.86✓ | 57.14 | 100.00 |
| neptune | na | 5.21 | 0.01 | 5.22 | na | 79.36✓ | — | 79.36 |
| phf | na | 100.00✓ | — | 100.00 | na | 25.00 | — | 25.00 |
| pod | na | 69.23✓ | — | 69.23 | na | 100.00✓ | — | 100.00 |
| teardrop | na | 3.05 | — | 3.05 | na | 6.60 | — | 6.60 |
| spy | na | 100.00✓ | — | 100.00 | na | — | — | — |
| smurf | na | 99.98✓ | — | 99.98 | na | 100.00✓ | — | 100.00 |
| U2R | 70.59 | 14.71 | 5.88 | 91.18 | 44.12 | 35.29 | 14.71 | 94.12 |
| R2L | 93.17 | 5.22 | 0.80 | 99.20 | 91.97 | 4.02 | 0.40 | 96.39 |
| DOS | 0.56 | 73.20✓ | — | 73.76 | 0.56 | 93.55✓ | — | 94.11 |
| PRB | na | 75.92✓ | — | 75.92 | na | 58.07✓ | — | 58.07 |
| % far | | | 0.38 | | | | 0.30 | |

| | $dataset_7$ | | | | $dataset_8$ | | | |
|---|---|---|---|---|---|---|---|---|
| | % tc | % a | % othr | % ttl | % tc | % a | % othr | % ttl |
| normal | 99.29 | 0.70 | na | na | 99.19 | 0.79 | na | na |
| back | 98.64 | 1.36 ○ | — | 100.00 | 98.64 | 1.36 ○ | — | 100.00 |
| buffer_overflow | 80.00 | 20.00 ○ | — | 100.00 | 20.00 | 80.00 ○ | — | 100.00 |
| loadmodule | 88.89 | 11.11 ○ | — | 100.00 | 44.44 | 44.44 ○ | 11.11 | 100.00 |
| perl | 100.00 | — | — | 100.00 | 100.00 | — | — | 100.00 |
| rootkit | na | 80.00✓ | — | 80.00 | 60.00 | — | — | 60.00 |
| ftp_write | 75.00 | 12.50 | — | 87.50 | 100.00 | — | — | 100.00 |
| warezclient | 96.62 | 1.45 | — | 98.07 | 96.14 | 2.42 | — | 98.55 |
| warezmaster | 60.00 | — | 20.00 | 80.00 | 60.00 | 20.00 ○ | — | 80.00 |
| guess-passwd | 90.91 | 9.09 ○ | — | 100.00 | 90.91 | 9.09 ○ | — | 100.00 |
| imap | 100.00 | — | — | 100.00 | 100.00 | — | — | 100.00 |
| land | 75.00 | — | — | 75.00 | 75.00 | 25.00 ○ | — | 100.00 |
| portsweep | 99.04 | 0.96 ○ | — | 100.00 | 99.04 | 0.48 ○ | — | 99.52 |
| satan | 99.37 | 0.32 ○ | — | 99.68 | 98.73 | 1.27 ○ | — | 100.00 |
| ipsweep | na | 56.05✓ | — | 56.05 | 99.19 | 0.40 ○ | — | 99.60 |
| nmap | na | 52.17✓ | 41.30 | 93.48 | 89.13 | 10.87 ○ | — | 100.00 |
| multihop | na | 57.14✓ | 42.86 | 100.00 | na | 42.86✓ | 28.57 | 71.43 |
| neptune | na | 19.17 | 0.20 | 19.37 | na | 98.85✓ | 0.94 | 99.79 |
| phf | na | 100.00✓ | — | 100.00 | na | 25.00 | — | 25.00 |
| pod | na | 100.00✓ | — | 100.00 | na | 100.00✓ | — | 100.00 |
| teardrop | na | 13.71 | — | 13.71 | na | 88.32✓ | 6.60 | 94.92 |
| spy | na | 50.00✓ | — | 50.00 | na | 50.00✓ | — | 50.00 |
| smurf | na | 100.00✓ | — | 100.00 | na | 100.00✓ | — | 100.00 |

TABLE 5-continued

| | | | | | | | | |
|---|---|---|---|---|---|---|---|---|
| U2R | 44.12 | 41.18 | 8.82 | 94.12 | 41.18 | 32.35 | 8.82 | 82.35 |
| R2L | 92.77 | 4.02 | 0.40 | 97.19 | 93.17 | 3.61 | — | 96.79 |
| DOS | 0.56 | 77.08✓ | 0.05 | 77.70 | 0.56 | 99.10✓ | 0.27 | 99.93 |
| PRB | 63.57 | 20.29 | 2.32 | 86.19 | 98.41 | 1.34 | — | 99.76 |
| % far | | 0.22 | | | | 0.20 | | |

$dataset_i$: normal + $cluster_{l-t}$ + DBA2-generated anomalies from (normal + $cluster_{l-t}$)

✓: significant anomaly detection, or % a > 100%

○: significant compensation for misuse detection, or (% tc + % a ≅ 100% ˆ % tc < 100%) v (% a ≧ 0.25 × % tc)

TABLE 6

| | $dataset_9$ | | | | $dataset_{10}$ | | | |
|---|---|---|---|---|---|---|---|---|
| | % tc | % a | % othr | % ttl | % tc | % a | % othr | % ttl |
| normal | 99.07 | 0.91 | na | na | 99.40 | 0.59 | na | na |
| back | 98.64 | 1.36 ○ | — | 100.00 | 99.95 | 0.45 ○ | — | 100.00 |
| buffer_overflow | 40.00 | 40.00 ○ | 20.00 | 100.00 | 40.00 | 60.00 ○ | — | 100.00 |
| loadmodule | 66.67 | 33.33✓ | — | 100.00 | 88.89 | 11.11 ○ | — | 100.00 |
| perl | 66.67 | — | — | 66.67 | 100.00 | — | — | 100.00 |
| rootkit | 40.00 | 60.00 ○ | — | 100.00 | 100.00 | — | — | 100.00 |
| ftp_write | 100.00 | — | — | 100.00 | 100.00 | — | — | 100.00 |
| warezclient | 97.58 | 1.93 ○ | — | 99.52 | 96.62 | 3.38 ○ | — | 100.00 |
| warezmaster | 60.00 | 20.00 ○ | 20.00 | 100.00 | 60.00 | — | 40.00 | 100.00 |
| guess-passwd | 90.91 | 9.09 ○ | — | 100.00 | 90.91 | 9.09 ○ | — | 100.00 |
| imap | 100.00 | — | — | 100.00 | 100.00 | — | — | 100.00 |
| land | 100.00 | — | — | 100.00 | 100.00 | — | — | 100.00 |
| portsweep | 99.04 | 0.96 ○ | — | 100.00 | 99.04 | 0.96 ○ | — | 100.00 |
| satan | 99.05 | 0.95 | — | 100.00 | 98.42 | 0.63 ○ | — | 99.05 |
| ipsweep | 98.79 | 0.81 ○ | — | 99.60 | 100.00 | — | — | 100.00 |
| nmap | 89.13 | 10.87 ○ | — | 100.00 | 100.00 | — | — | 100.00 |
| multihop | 100.00 | — | — | 100.00 | 100.00 | — | — | 100.00 |
| neptune | na | 99.91✓ | 0.05 | 99.96 | 99.89 | 0.10 ○ | — | 99.99 |
| phf | na | 100.00✓ | — | 100.00 | na | 2.500 | — | 25.00 |
| pod | na | 100.00✓ | — | 100.00 | na | 100.00✓ | — | 100.00 |
| teardrop | na | 94.42✓ | 0.51 | 94.92 | na | 93.91✓ | — | 93.91 |
| spy | na | — | — | — | na | 50.00✓ | — | 50.00 |
| smurf | na | 100.00✓ | — | 100.00 | na | 100.00✓ | — | 100.00 |
| U2R | 61.76 | 32.35 | 2.94 | 97.06 | 88.24 | 11.76 | — | 100.00 |
| R2L | 94.38 | 4.02 | 0.40 | 98.80 | 93.57 | 4.02 | 80.00 | 98.39 |
| DOS | 0.56 | 99.40✓ | 0.02 | 99.98 | 27.92 | 72.06✓ | — | 99.98 |
| PRB | 98.41 | 1.47 | — | 99.88 | 99.14 | 0.49 | — | 99.63 |
| % far | | 0.23 | | | | 0.20 | | |

| | $dataset_{11}$ | | | | $dataset_{12}$ | | | |
|---|---|---|---|---|---|---|---|---|
| | % tc | % a | % othr | % ttl | % tc | % a | % othr | % ttl |
| normal | 99.36 | 0.62 | na | na | 99.46 | 0.53 | na | na |
| back | 98.64 | 1.36 ○ | — | 100.00 | 98.87 | 1.13 ○ | — | 100.00 |
| buffer_overflow | 100.00 | — | — | 100.00 | 60.00 | 40.00 ○ | — | 100.00 |
| loadmodule | 77.78 | 22.22 ○ | — | 100.00 | 77.78 | 22.22 ○ | — | 100.00 |
| perl | 100.00 | — | — | 100.00 | 100.00 | — | — | 100.00 |
| rootkit | 90.00 | 10.00 ○ | — | 100.00 | 100.00 | — | — | 100.00 |
| ftp_write | 100.00 | — | — | 100.00 | 100.00 | — | — | 100.00 |
| warezclient | 98.55 | 0.97 ○ | — | 99.52 | 95.65 | 1.45 | 0.48 | 97.58 |
| warezmaster | 60.00 | — | 20.00 | 80.00 | 60.00 | 20.00 ○ | — | 80.00 |
| guess-passwd | 90.91 | 9.09 ○ | — | 100.00 | 90.91 | 9.09 ○ | — | 100.00 |
| imap | 91/67 | — | — | 91.67 | 91.67 | 8.33 ○ | — | 100.00 |
| land | 75.00 | — | — | 75.00 | 100.00 | — | — | 100.00 |
| portsweep | 99.04 | 0.96 ○ | — | 100.00 | 98.08 | 1.92 ○ | — | 100.00 |
| satan | 99.37 | 0.63 ○ | — | 100.00 | 97.47 | 2.53 ○ | — | 100.00 |
| ipsweep | 99.19 | 0.40 ○ | — | 99.60 | 99.19 | 0.40 ○ | 0.40 | 100.00 |
| nmap | 95.65 | 4.35 ○ | — | 100.00 | 93.48 | 6.52 ○ | — | 100.00 |
| multihop | 100.00 | — | — | 100.00 | 100.00 | — | — | 100.00 |
| neptune | 99.81 | 0.18 ○ | — | 100.00 | 99.81 | 0.18 ○ | — | 99.99 |
| phf | 100.00 | — | — | 100.00 | 100.00 | — | — | 100.00 |
| pod | na | 100.00✓ | — | 100.00 | 100.00 | — | — | 100.00 |
| teardrop | na | 86.29✓ | 1.52 | 87.82 | 97.46 | 2.54 ○ | — | 100.00 |
| spy | na | — | — | — | na | — | — | — |
| smurf | na | 100.00✓ | — | 100.00 | na | 100.00✓ | — | 100.00 |
| U2R | 91.18 | 8.82 | — | 100.00 | 88.24 | 11.76 | — | 100.00 |
| R2L | 96.39 | 1.20 | 0.40 | 97.99 | 93.98 | 2.41 | 0.40 | 96.79 |

TABLE 6-continued

| | | | | | | | | | |
|---|---|---|---|---|---|---|---|---|---|
| DOS | 27.89 | 72.07✓ | 0.01 | 99.97 | 28.21 | 71.79✓ | — | 100.00 |
| PRB | 99.02 | 0.86 | — | 99.88 | 97.92 | 1.96 | 0.12 | 100.00 |
| % far | | | 0.21 | | | | 0.18 | | dataset$_i$: normal + cluster$_{1-t}$ + DBA2-generated anomalies from (normal + cluster$_{1-t}$)
✓: significant anomaly detection, or % a > 100%
o: significant compensation for misuse detection, or (% tc + % a ≅ 100% ^ % tc < 100%) v (% a ≧ 0.25 × % tc)

In all sub-tables, intrusion classes with na, entries in the % tc columns are true anomalies, as they do not exist in the training data, and thus have no misuse roles generated for them. In the analysis, an anomaly detection model is considered to be significant for a particular detection class if % a≧50.00%. All significant results are highlighted by √. Across 12 experimental settings, there are 122 truly anomalous cases, among which, 92 are significant; this is more than 75%. For each experimental setting, the percentage of cases that are significant is shown in Table 7, below; most are at least 70%.

TABLE 7

| Dataset | 0 | 1 | 2 | 3 | 4 | 5 | 6 | 7 | 8 | 9 | 10 | 11 | 12 |
|---|---|---|---|---|---|---|---|---|---|---|---|---|---|
| Anomaly Types | 22 | 21 | 17 | 14 | 13 | 12 | 11 | 10 | 7 | 6 | 5 | 4 | 2 |
| Significant | 13 | 15 | 14 | 10 | 8 | 9 | 7 | 8 | 6 | 5 | 5 | 3 | 2 |
| % | 59 | 71 | 82 | 71 | 62 | 75 | 64 | 80 | 86 | 83 | 100 | 75 | 100 |

Figure 9:
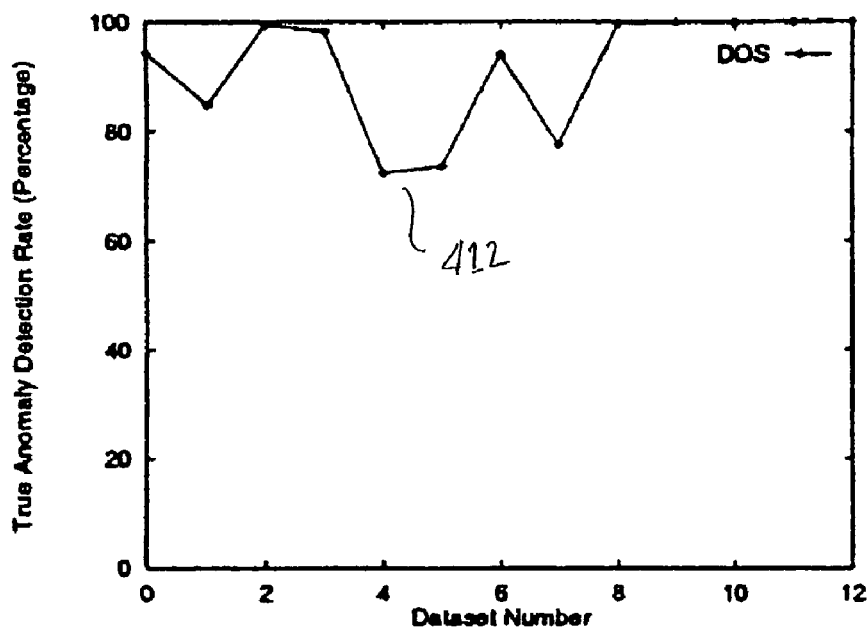
FIG. 9 is plot representing the percentage of true anomalies detected as anomalies for DOS intrusions in accordance with the present invention.
Figure 10:
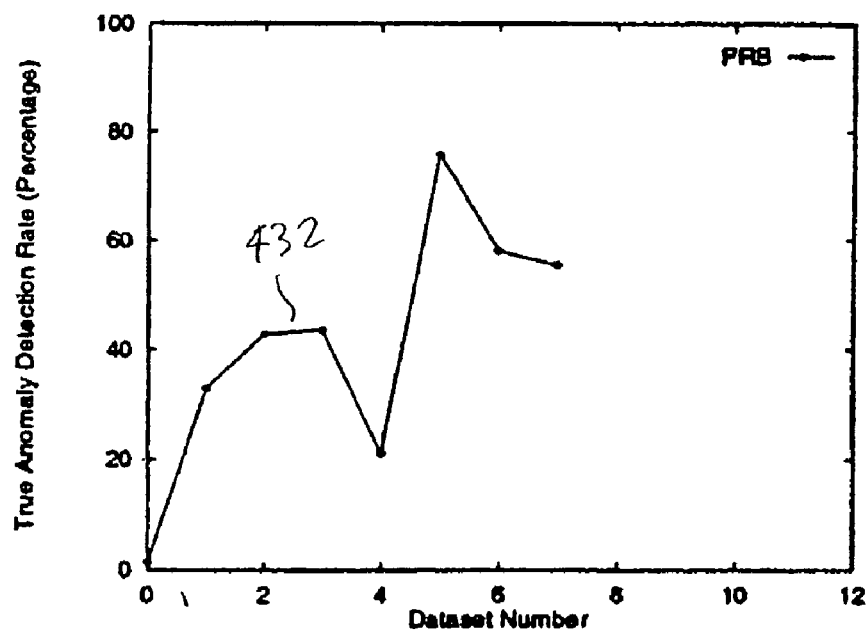
FIG. 10 is plot representing the percentage of true anomalies detected as anomalies for PRB intrusions in accordance with the present invention.

Next, the effectiveness of anomaly detection on different categories of true anomalies was studied. The anomaly detection rate (% a) of true anomalies in each intrusion category and all true anomalies (TTL) was measured. The results are presented in FIGS. 7-11 (USR curve 402 in FIG. 7; R2L curve 412 in FIG. 8; DOS curve 422 in FIG. 9; and PRB curve 432 in FIG. 10), and Table 8.

12 cases, the intrusions are detected as some other intrusion, leaving no room for anomaly detection to provide any compensation. In FIGS. 12-15, the total percentage of detection (% ttl) four all for categories of intrusions are illustrated (USR curve 502 in FIG. 12; R2L curve 512 in FIG. 13; DOS curve 522 in FIG. 14; and PRB curve 532 in FIG. 15). There is a general trend of increase.

Figure 4:
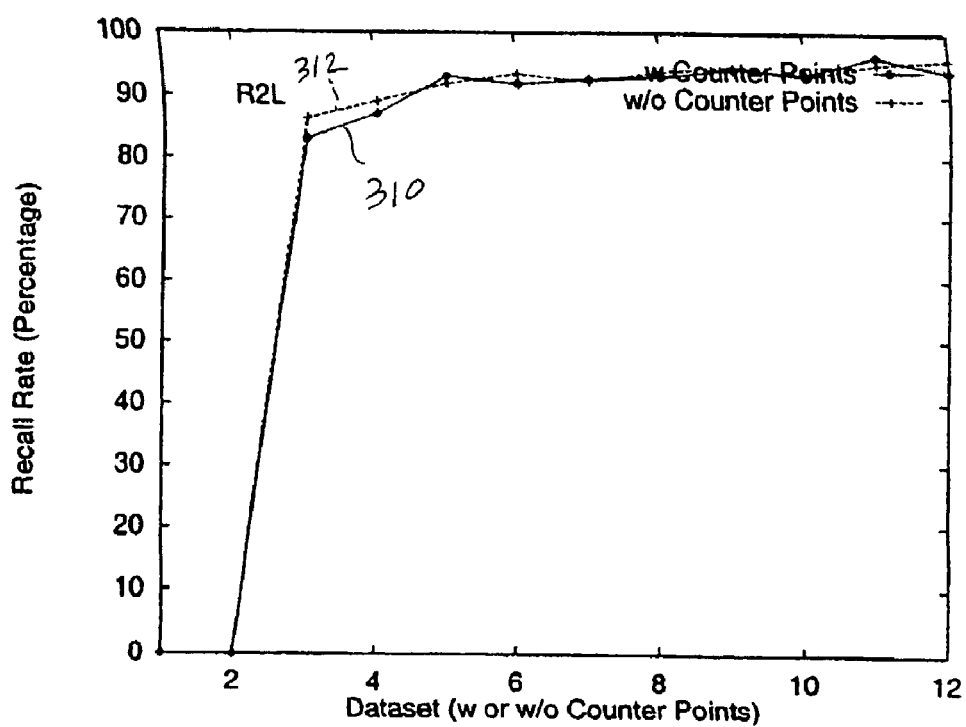
FIG. 4 is plot representing the true class detection rate for R2L intrusions in accordance with the present invention.
Figure 5:
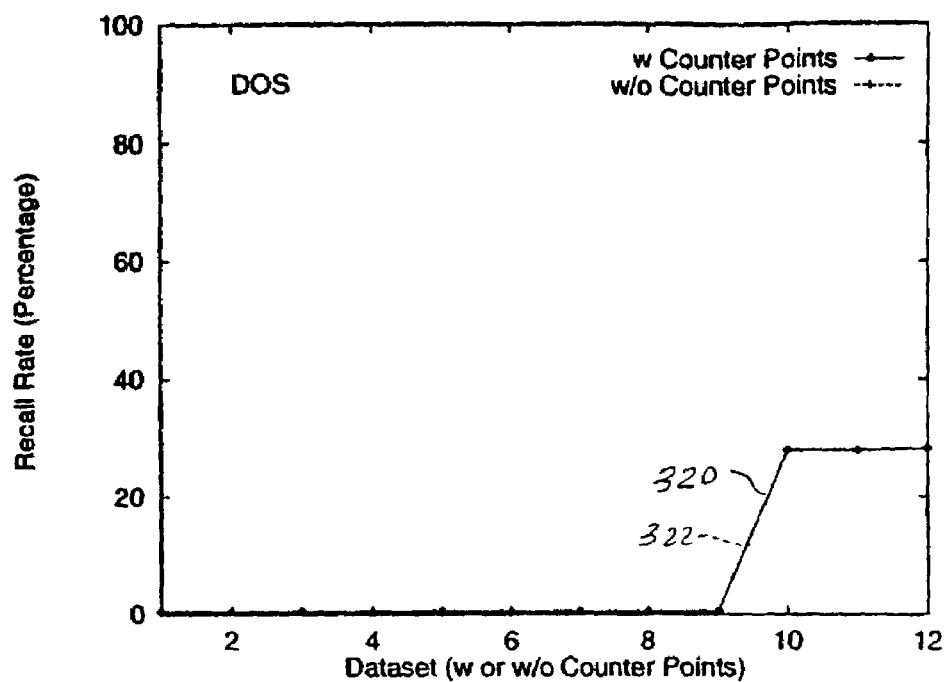
FIG. 5 is plot representing the true class detection rate for DOS intrusions in accordance with the present invention.
Figure 6:
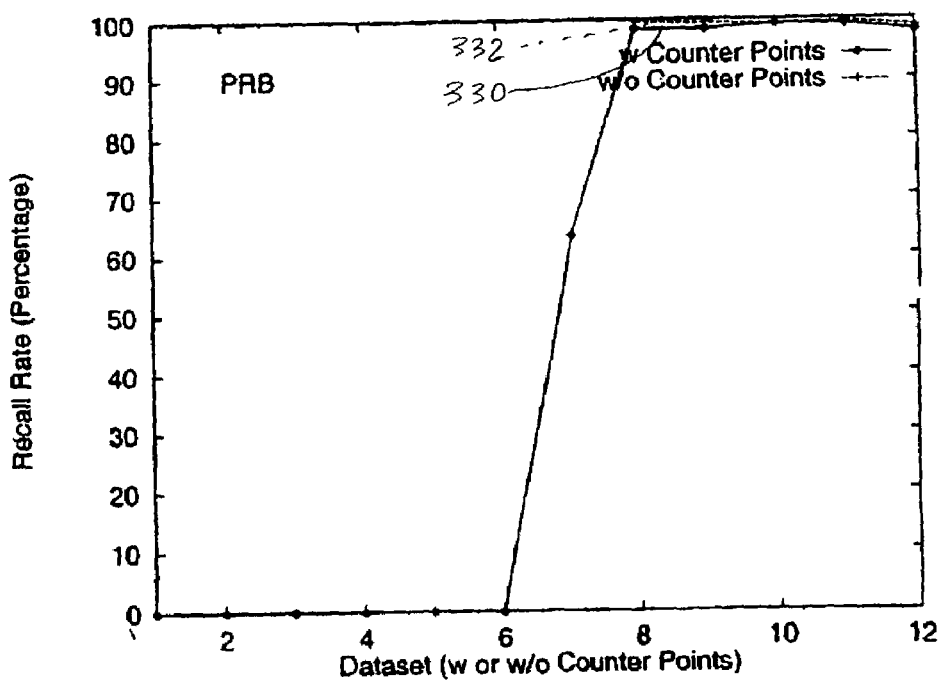
FIG. 6 is plot representing the true class detection rate for PRB intrusions in accordance with the present invention.

The combined overall performance of detecting both true anomalies and know intrusions is shown. The results over all four intrusion categories are shown at the bottom of each sub-table of Tables 4-6, and the curves (% a) are shown in FIGS. 16-19 (USR curve 602 in FIG. 16; R2L curve 612 in FIG. 17; DOS curve 622 in FIG. 18; and PRB curve 632 in FIG. 19). As expected % a generally decreases as the datasets are augmented with more clusters of intrusions. This may be caused by the fact that more misuse rules are learned for more intrusions, leaving less room for these intrusions to be detected as anomalies. The shape of the anomaly detection rate curves is somewhat inversely related to their respective true class detection curves in FIGS. 3-6. This relationship may be explained by the observation that 1—% tc is an indication of the amount of additional detection that anomaly detection can provide. These decreasing and inverse relationships apply throughout the U2R, R2L and DOS curves, and can be seen in the PRB curves for datasets$_{6-12}$. As illustrated in FIGS. 3-4, as more intrusion clusters are used to augment

TABLE 8

| Dataset | 0 | 1 | 2 | 3 | 4 | 5 | 6 | 7 | 8 | 9 | 10 | 11 | 12 |
|---|---|---|---|---|---|---|---|---|---|---|---|---|---|
| U2R | 47.06 | 52.94 | 71.43 | 28.57 | 57.14 | 57.14 | 42.86 | 70.59 | 42.86 | na | na | na | na |
| R2L | 66.67 | 71.08 | 40.96 | 93.10 | 77.78 | 100.0 | 16.67 | 83.33 | 33.33 | 66.67 | 33.33 | 0.00 | 0.00 |
| DOS | 94.31 | 84.82 | 99.53 | 98.22 | 72.37 | 73.61 | 94.08 | 77.52 | 99.65 | 99.96 | 99.98 | 99.95 | 100.0 |
| PRB | 1.34 | 32.89 | 42.79 | 43.64 | 21.15 | 75.92 | 58.07 | 55.44 | na | na | na | na | na |
| TEL | 94.26 | 84.78 | 99.46 | 98.18 | 72.33 | 73.57 | 94.02 | 77.46 | 99.65 | 99.96 | 99.97 | 99.95 | 100.0 |

Figure 11:
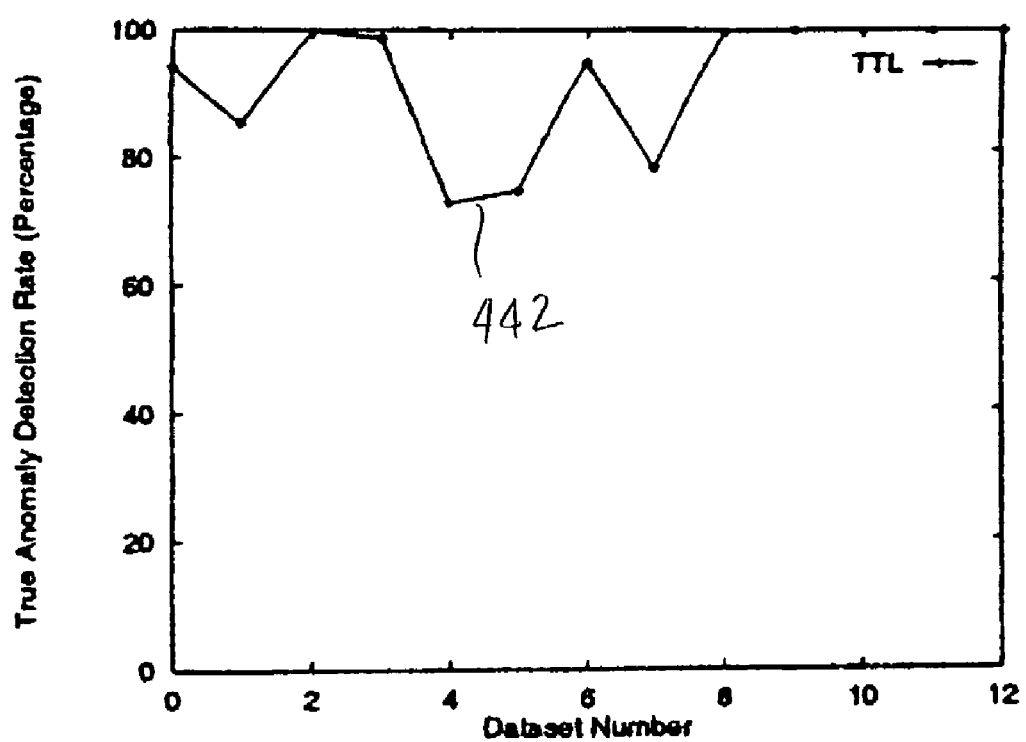
FIG. 11 is plot representing the percentage of true anomalies detected as anomalies for all true anomalies in the dataset in accordance with the present invention.
Figure 12:
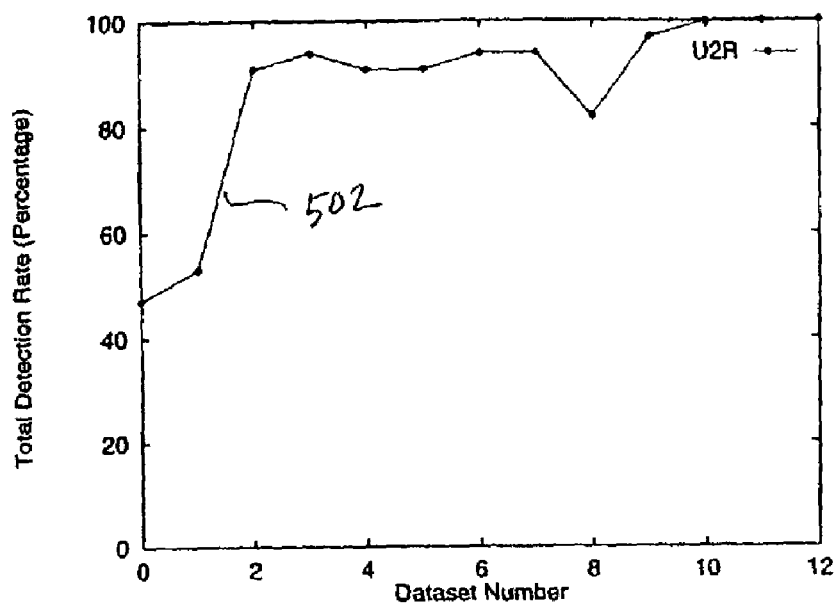
FIG. 12 is plot representing the total detection rate for U2R intrusions in accordance with the present invention.
Figure 13:
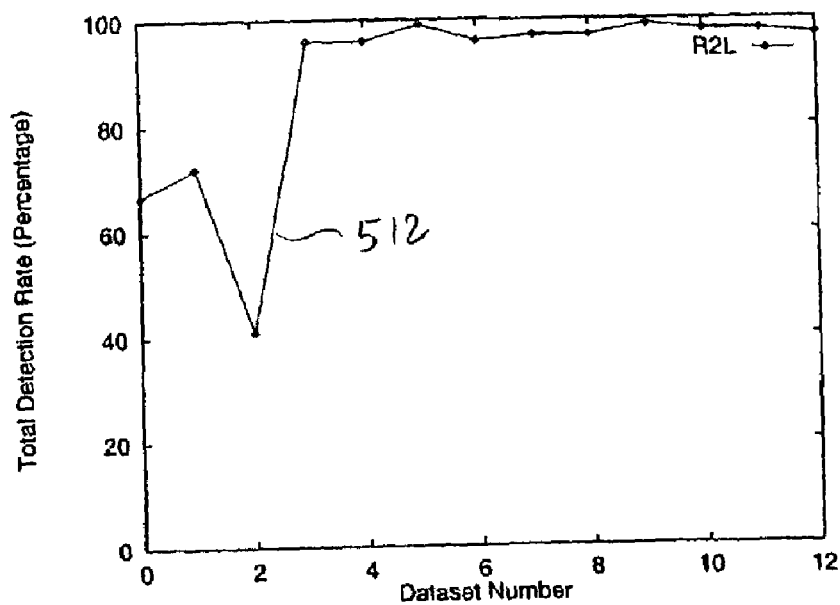
FIG. 13 is plot representing the total detection rate for R2L intrusions in accordance with the present invention.
Figure 14:
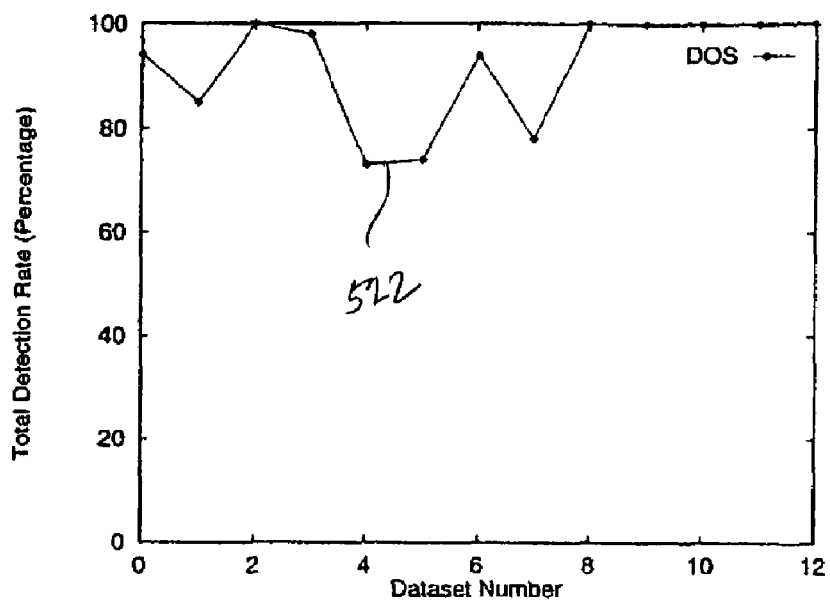
FIG. 14 is plot representing the total detection rate for DOS intrusions in accordance with the present invention.
Figure 15:
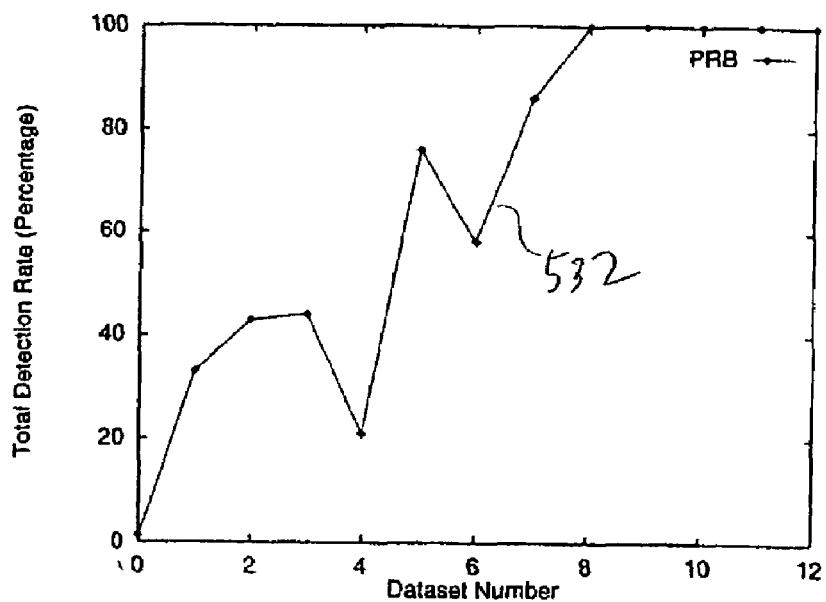
FIG. 15 is plot representing the total detection rate for PRB intrusions in accordance with the present invention.
Figure 16:
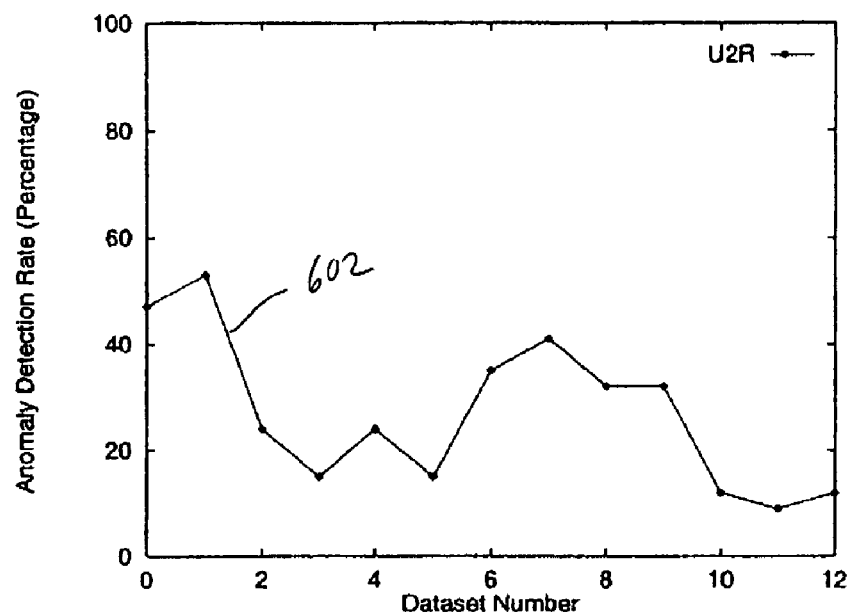
FIG. 16 is plot representing the percentage of known intrusions and true anomalies detected as anomalies for U2R intrusions in accordance with the present invention.
Figure 17:
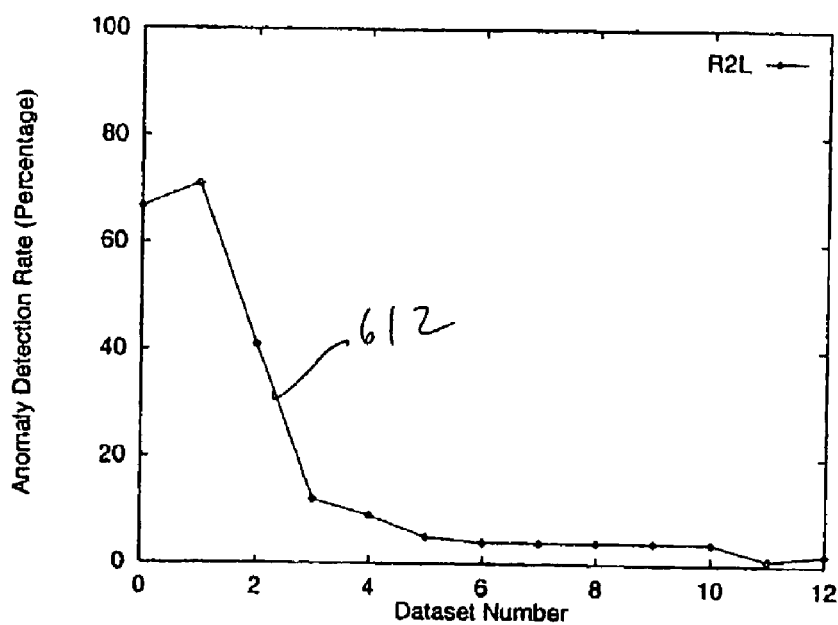
FIG. 17 is plot representing the percentage of known intrusions and true anomalies detected as anomalies for R2L intrusions in accordance with the present invention.
Figure 18:
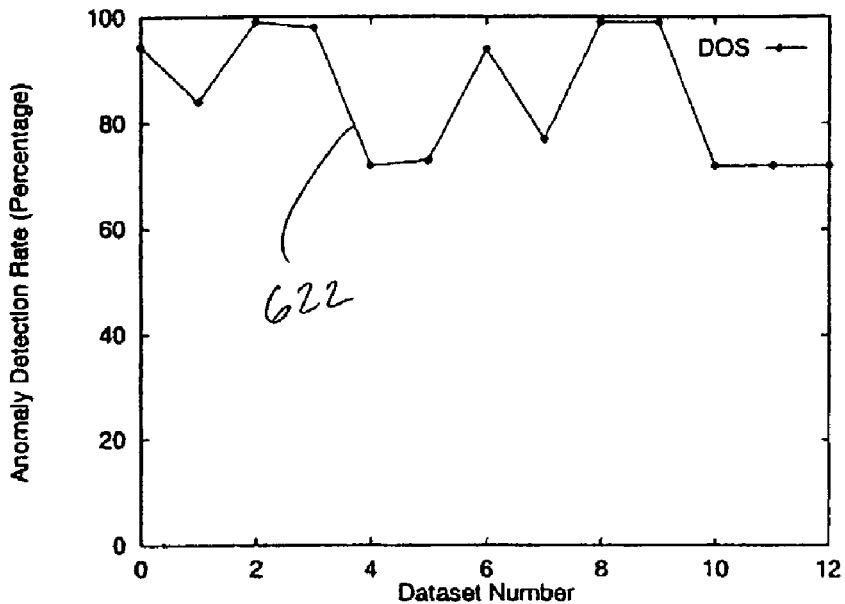
FIG. 18 is plot representing the percentage of known intrusions and true anomalies detected as anomalies for DOS intrusions in accordance with the present invention.

As shown in the standalone curve 442 in FIG. 11; and the last row of Table 8 under "TTL," the true anomaly detection rate for all true anomalies remains relatively constant as more clusters of intrusions are injected. The curves 402, 422, and 432 for the U2R, R2L, and PRB categories, respectively, are more bumpy than the DOS curve 422 because the anomaly detection model catches more in one category and fewer in the others.

Figure 7:
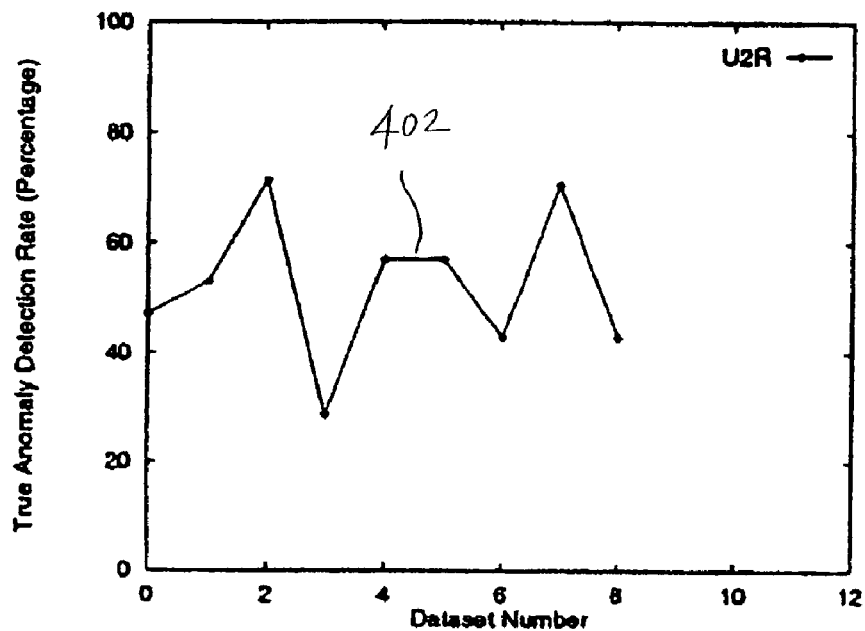
FIG. 7 is plot representing the percentage of true anomalies detected as anomalies for U2R intrusions in accordance with the present invention.
Figure 8:
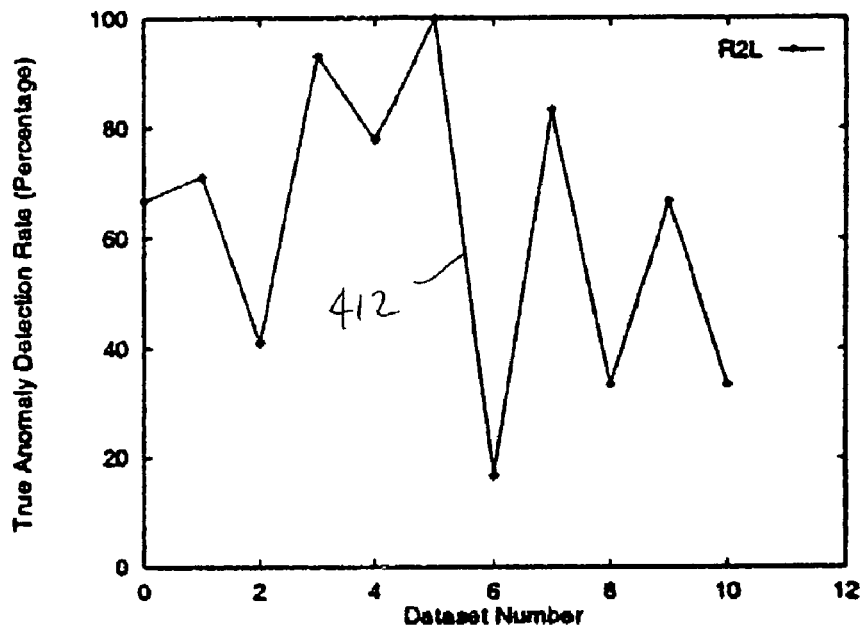
FIG. 8 is plot representing the percentage of true anomalies detected as anomalies for R2L intrusions in accordance with the present invention.
Figure 19:
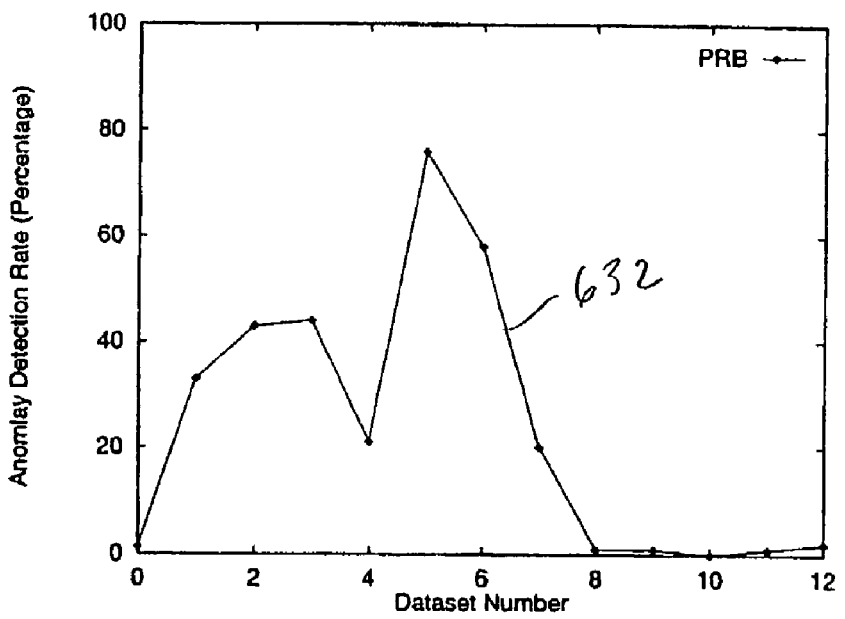
FIG. 19 is plot representing the percentage of known intrusions and true anomalies detected as anomalies for PRB intrusions in accordance with the present invention.

Another comparison is to determine if the novel method is effective in detecting unclassified known intrusions as anomalies. An anomaly detection method is considered to "significantly compensate" for misuse detection if either the anomaly detection increases the total rate of detection to nearly 100% (% tc+% a$_≈$100%, % tc<100%) or % a≧0.25×% tc when % tc is very low. In Tables 4-6, all significant compensations are highlighted by O. There are 88 cases that are candidates for compensation (i.e., % tc<100%). Among them, 76 cases (or 86%) are significantly compensated by being detected as anomalies. In five of the remaining the normal data, the true class detection rates for both U2R and R2L increase and less room remains for anomaly detection to compensate. This may explain the generally decreasing tendency of U2R and R2L % a curves (FIGS. 7-8). For DOS attacks, the true class detection rate only rises from 0 to 30% after dataset$_9$ (FIG. 5), and there is still sufficient room for compensation by anomaly detection—this may explain the flatness of the DOS % a curve in FIG. 9. For PRB, the rise in % tc takes place after dataset$_{6-12}$ (FIG. 6) which is also when there is a complementary decrease in % a for datasets$_{6-12}$ (FIG. 19). The slight bumpiness of the U2R % a (FIG. 12) curve may be due to the inverse bumpiness of U2R % tc curve in (FIG. 3).

The last row of each sub-table within Tables 4-6 displays the false alarm rate of anomalous classification. All these values are uniformly below 0.40%. This appears to confirm that nearly all detected anomalies are either true anomalies or known intrusions. Additionally, the % tc rates of normal connections (or normal correctly classified as normal), as shown in the first row of each sub-table, are over or near 99.00%. These observations show the utility of the anomaly detection approach in building highly precise models.

Two additional tests to verify that the results are not influenced by the order in which clusters are added to the training sets. One test is to completely reverse the cluster ordering as in the previous section, and the other one is a random ordering totally different from the original or second orderings. The results are shown in Table 9. The different orderings are marked as "Org," "Rev" and "Rnd," which refers to "original," "reverse" and "random". For each ordering, the average false alarm rate (% far) and average total detection rate (% ttl) is shown for four categories of intrusions over twelve incremental inclusions of intrusion clusters. The results have confirmed that the novel method is not influenced by cluster order, as the differences are minor.

TABLE 9

|  | Org | Rev | Rnd |
|---|---|---|---|
| Average % ttl | | | |
| U2R | 90.69 | 94.72 | 92.73 |
| R2L | 85.52 | 87.23 | 82.34 |
| DOS | 91.72 | 93.42 | 94.43 |
| PRB | 71.65 | 68.75 | 79.19 |
| Average % far | | | |
|  | 0.245 | 0.253 | 0.232 |

As discussed above, different amounts of injected artificial anomalies may be used (n=1.5 or 2), where n is a factor used to multiply the number of artificial anomalies generated. The general trend is that as the injection amount is increased, % tc of normal connections decreases slightly and %, far increases slightly. In the worst case, % tc drops to slightly over 91% and % far increases to approximately 3%. The % a rate changes slightly as well, with some intrusion categories having greater % a rate, and some less, than when n=1. On average, however, increased amounts of artificial anomalies are still as effective as with n=1 (in the reported results). One explanation is that when the amount of injected artificial anomalies increases, there are more artificial anomalies than normal connections in the training data and the learning algorithm tends to generate more anomaly rules. In general, the proposed algorithm is not sensitive to the amount of artificial anomalies in the training data.

In other embodiments of the invention, other forms of RIPPER rulesets were used (+freq and given, both of which are ordered rulesets). An ordered rule set is usually succinct and efficient. Evaluation of an entire ordered rule set does not require each rule to be tested, but proceeds from the top of the rule set to the bottom until any rule evaluates to true. The features used by each rule can be computed one by one as evaluation proceeds. The operational cost to evaluate an ordered rule set for a given event is the total cost of computing unique features until a predicting is made. For intrusion detection, a −freq rule set is usually lowest in operational cost and accurately classifies normal events. This is because the first rules of the rule set identify normal operation, which is typically the most frequently occurring class. +freq rule sets classify connections in order of increasing frequency followed by normal, with a default classification of anomaly. For given, the following rule order was used: normal, anomaly and alphabetically ordered intrusion classes (essentially arbitrary). This given ruleset filters normal connections efficiently, as they are classified first. The results gathered for the use of a +freq ruleset are very close to the detailed results given for our unordered rulesets. The given rulesets are similar to unordered rulesets at later datasets (when more than three clusters of intrusions are added to the normal data). However, in the first two datasets (dataset$_1$ and dataset$_2$), the anomaly detection is more likely to classify known intrusions as anomalies. This may be due to the fact that anomaly rules appear before intrusion rules.

Figure 20:
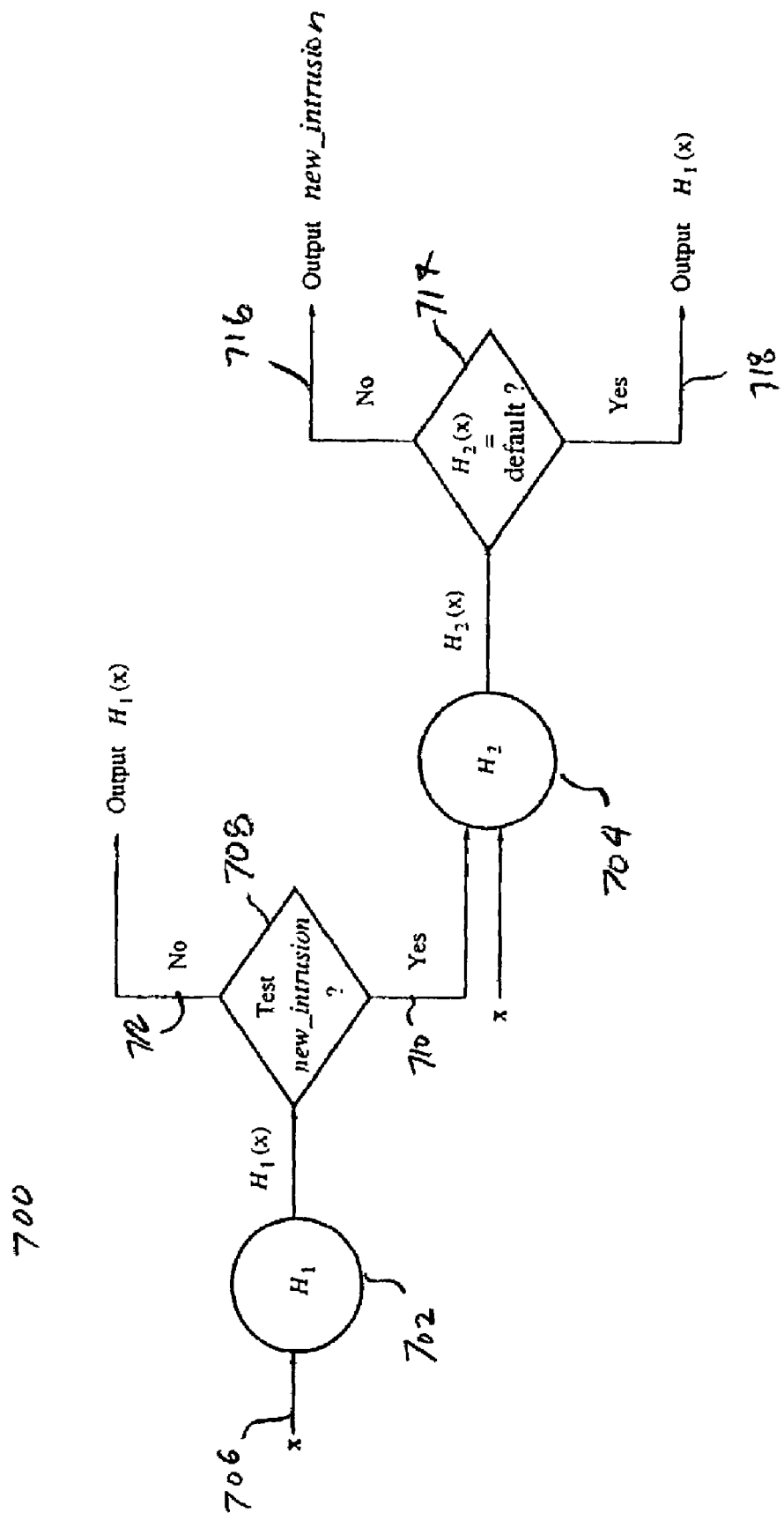
FIG. 20 is a flowchart representing the use of ensemble detection in accordance with the invention.

Ensemble-based adaptive learning is illustrated in FIG. 20. The discussion herein concerns the situation where one new type of intrusion is most recently detected and knowledge of this new intrusion must be efficiently incorporated into a detection model. For IDSs, this class may be referred to as new_intrusion. The ensemble-based adaptive learning technique is a combined misuse and anomaly detection method. In other words, it detects known intrusions, the new intrusion, and anomalies at the same time.

This approach uses a first classifier $H_1$ 702 and a second classifier $H_2$ 704 for classifying an instance x 706. The first classifier $H_1$ is trained from all available data at the time of training plus artificial anomalies generated from this data, i.e., normal and anomaly data. This approach exploits the predicted majority or default class used by the original classifier. For IDSs, they are normal or anomaly." However, the first classifier $H_1$ is not trained from new_intrusion data. When an instance x is classified as anomaly or normal by the first model, it is determined at 708 whether the instance should be further labeled by the second classifier $H_2$ (710) as will be described below, or output (712). The second classifier $H_2$ is only capable of identifying one or a few classes that the first classifier $H_1$ has no knowledge of, i.e., those instances that $H_1$ may misclassify as normal or anomaly. As determined at 714, the second classifier $H_2$ will predict a default dummy class if it fails to match the record to any of its known classes, and the final prediction will be either anomaly or normal as predicted by the first classifier $H_1$ (718), otherwise it will predict new_intrusion 716. There are different configurations, some of which are described below, regarding how the second classifier $H_2$ is trained when data of an entire new class is aggregated, and how the decision of the first and second classifiers are combined to produce a final prediction. Although these methods are applicable to a wide variety of domains, the discussion herein concerns intrusion detection.

Configuration I The second classifier $H_2$ is trained from new_intrusion and normal data. The decision rules in Table 10 are evaluated to compute the final outcome. Each classifier can be a decision tree, a ruleset, a probability network; a neural network and the like.

TABLE 10 if ($H_1(x)$ = normal) or ($H_1(x)$ = anomaly) then
    — if $H_2(x)$ = normal
        then output ← $H_1(x)$ (normal or anomaly)
    — else output ← new_intrusion
else output ← $H_1(x)$ Thus if $H_1$ classifies the instance x as normal OR anomaly then the instance goes to $H_2$ for classification. Since $H_1$ cannot identify new_intrusion, most of the instances will be classified as either anomaly or normal. The second classifier $H_2$ is computed from new_intrusion and normal data. Since new_intrusion is the minority class, $H_2$ is typically more effective at distinguishing it from other classes. In fact, if $H_2$ may be a +freq ruleset that only recognizes new_intrusion. Other normal and anomaly connections predicted by $H_1$ are classified as normal by $H_2$; therefore, the prediction by $H_1$ is used, which is either normal or anomaly.

Configuration II This is substantially identical to Configuration I, with the following differences noted herein. Configuration II is represented at Table 11. In this case, the record will be given to $H_2$ for classification only when $H_1(x)$=anomaly. If $H_1$ has a high precision for predicting normal or high recall rate for predicting anomaly, the performance of both configurations will be very close. Otherwise, the first configuration will have a higher recall rate for new_intrusion.

TABLE 11 if $H_1(x)$ = anomaly then
— if $H_2(x)$ = normal
then output ← $H_1(x)$ (normal or anomaly)
— else output ← new_intrusion
else output ← $H_1(x)$ Configuration III The combination rules for Configuration III are shown in Table 12. The second classifier $H_2$ is trained from new_intrusion and artificial anomalies computed from new_intrusion's data. Most instances of new_intrusion will be classified as anomaly by $H_1$ and the second classifier will discriminate them from the rest.

TABLE 12 if $H_1(x)$ = anomaly then
— if $H_2(x)$ = anomaly then outcome ← anomaly
— else output ← new_intrusion
else output ← $H_1(x)$ Configuration IV Configuration IV is substantially identical to Configuration III, with the following differences noted herein. For Configuration IV, all predicted normal and anomalies will be given to $H_2$ for classification.

TABLE 13 if ($H_1(x)$ = normal $\vee$ ($H_1(x)$ = anomaly) then
— if $H_2(x)$ = anomaly then outcome ← anomaly
— else output ← new_intrusion
else output ← $H_1(x)$ In all four configurations described herein, instances predicted as anomaly by $H_1$ will always be sent to $H_2$ to identify possible new_intrusion. If the precision of normal classification or rate of anomaly detection is not perfect, sending predicted normal records to $H_2$ will increase recall rate of new_intrusions, but at the same time it will reduce the classification throughput rate up to 50% since most connections in reality are normal anyway. It is possible to dynamically decide if sending predicted normal connections based on system performance, i.e., accuracy vs. efficiency.

The purpose of ensemble-based adaptive learning is to significantly increase learning efficiency, but at the same time preserve accuracy. To verify the effectiveness of the ensemble approach, training efficiency, testing accuracy and efficiency was compared with monolithic classifiers trained from an initial set of training data. A real world scenario was simulated, in which the detection model is trained from data of a few intrusion classes and later some new intrusion types and data are available for learning. There are n+1 connection classes in the evaluation dataset, including n different types of intrusions and normal; the data of connection class t is denoted as $D_t$. The full set of connection classes is $F=\{l_1, \ldots, l_{n+1}\}$. We form n initial training sets $S_i$ (i=0, ..., n−1) and keep track of connection classes excluded from $S_i$ in a set of labels $L_i$; $S_0=D_{normal}$ and $L_0=F-\{normal\}$, $S_i=S_{i-1}\cup D_l$ and $L_i=L_{i-1}-\{l\}$, where l is any label s.t. l∈$L_{i-1}$.

The excluded intrusions $D_{l'}$ (where l' is any class s.t. l∈$L_i$) are taken individually as new_intrusions to train $H_2$ for the ensemble-based approach. As a comparison, we compute a monolithic classifier from $S_i \cup D_{l'}$ plus computed artificial anomalies. For each $S_i$, there are n−i different tests. For n initial training sets, there are $$\sum_{0}^{n-1} (n-i) \frac{n(n-1)}{2}$$

unique tests.

For n intrusion types, there are totally n! different ordering on how the intrusions are introduced to produce initial training set and there are as many as n!n(n−1)/2 learning tasks. In the 1998 DARPA intrusion detection evaluation dataset, there are 22 intrusion types, which allowed us to run $$231 \left( = \frac{22 \times 21}{2} \right)$$

comparisons for each ordering. To avoid 21! (or $1.124 \times 10^{21}$) different orderings and $2.60 \times 10^{23}$ comparisons, we have chosen only the three unique ordering shown in Table 14.

TABLE 14

| 1 | back | smurf | pert |
|---|---|---|---|
| 2 | buffer_overflow | spy | land |
| 3 | loadmodule | teardrop | phf |
| 4 | perl | pod | multihop |
| 5 | rootkit | phf | back |
| 6 | ftp_write | neptune | imap |
| 7 | warezclient | multihop | warezmaster |
| 8 | warezmaster | nmap | smurf |
| 9 | guess_passwd | ipsweep | neptune |
| 10 | imap | Satan | guess_passwd |
| 11 | land | portsweep | spy |
| 12 | portsweep | land | satan |
| 13 | satan | imap | rootkit |
| 14 | ipsweep | guess_passwd | ipsweep |
| 15 | nmap | warezmaster | teardrop |
| 16 | multihop | warezclient | ftp_write |
| 17 | neptune | ftp write | loadmodule |
| 18 | phf | rootkit | pod |
| 19 | pod | perl | warezelient |
| 20 | teardrop | loadmodule | buffer_overflow |
| 21 | spy | buffer_overflow | portsweep |
| 22 | smurf | back | nmap |

The ensemble-based method is compared with its respective monolithic classifier on both predictive accuracy and training efficiency. The following parameters are calculated: "precision," "recall," "anomaly detection," "other" and "false negative" (or "non-detection") rates to detect new_intrusions. These rates measure the effectiveness to detect new_intrusions from different aspects. (The false negative rate can be easily calculated from the other measures, but is reported here for clarity.) Precision rate shows how much we can trust the prediction by the detector when it flags new_intrusion. Recall rate tells us if we trust the prediction by the detector, how large a percentage of new_intrusions can be correctly detected. Other and anomaly detection rates tell us the percentage of true new_intrusions if not detected correctly but at least flagged as abnormal, i.e., other or abnormal. False negative informs us of the overall performance.

Since there are 231 comparisons for each ordering and five different measurements, and each comparison has results for both the ensemble and monolithic classifier, there are a total of 2310 (=231×2×5) measured rates for each ordering or 6930 for all three orderings. It would not be useful to report every detailed result. Instead, we report the average of the measured rates for the ensemble and monolithic classifier, and their differences as shown in Table 15.

TABLE 15

| | Precision (%) | | | Recall (%) | | |
|---|---|---|---|---|---|---|
| | e | m | e − m | e | m | e − m |
| I | 58.6 | 76.6 | −18.0 | 90.2 | 86.8 | 3.47 |
| II | 51.0 | | −25.6 | 50.2 | | −36.6 |
| III | 22.2 | | −54.4 | 46.1 | | −40.7 |
| IV | 17.0 | | −59.6 | 86.0 | | −0.8 |

| | Anomaly (%) | | | Other (%) | | | False Negative (%) | | |
|---|---|---|---|---|---|---|---|---|---|
| | e | m | e − m | e | m | e − m | e | m | e − m |
| I | 2.5 | 8.2 | −5.6 | 4.3 | 0.7 | +3.6 | 3.0 | 4.4 | −1.4 |
| II | 2.5 | | −5.6 | 4.3 | | +3.5 | 43.0 | | +38.6 |
| III | 6.7 | | −1.5 | 4.3 | | +3.5 | 43.0 | | +38.6 |
| IV | 6.7 | | −1.5 | 4.3 | | +3.5 | 3.0 | | −1.4 |

In Table 15, averaged precision, recall, anomaly, other and false negative rates are shown for the ensemble-based method (e) and monolithic classifier (m), and their differences (e−m) for all intrusion types over all three orderings of Table 14. The results of four configurations are shown in each row marked I to IV. Since-monolithic classifier is the basis of comparison, their results are collated into single columns.

Configuration I appears to have the best overall performance; it has significantly the highest precision and recall rates, which result in its lowest non-detection rate. Its precision rate is 20% lower than that of the monolithic classifier, which perhaps (not necessarily) contributes to its slightly higher recall rate. Its non-detection rate is slightly lower than that of the monolithic classifier due to its slightly higher recall rate. The second best performer is Configuration II. Its precision rate is slightly lower than that of I, but the recall rate is 40% lower, which results in its much higher non-detection rate. The big difference of recall and non-detection rates between I and II is apparently due to whether we use $H_2$ to examine predicted normals by $H_1$. Since the anomaly detection cannot detect all unknown anomalies, or the recall rate of anomaly detection is not 100%, it is useful to re-examine predicted normals of $H_1$ by $H_2$.

The performance of III and IV is worse than that of I and II; the precision rates are about 50% of I and II, and recall rates are slightly lower as well. The reason is that the data size for each intrusion type is very small by itself; a few types of intrusions have only 30 or 50 examples in the training data. It is hard to produce effective artificial anomalies from such a small sample. The recall rate of Configuration IV is higher than that of Configuration III since we use $H_2$ to re-examine predicted normals by $H_1$.

The anomaly detection rates of I and II, and also III and IV are the same; this is because $H_2$ is the same and the test set is also the same. The other detection rates of all four configurations are the same since it uses the same classifier (either $H_1$ or the monolithic classifier) when flagging new_intrusion as other types of known intrusions.

The training time was measured by running learning tasks in a separate machine that had no other jobs running at the same time, and all files were on the local hard disk. The training time included the time to generate artificial anomalies (for the monolithic classifier and configurations III and IV). The ensemble classifier approach finished in between 3 to 4 hours, but the monolithic classifier ran about 3 weeks or 504 hours for each order. In other words, the monolithic classifier approach is about 150 times more expensive than the ensemble approach. This significant difference in learning comes from that fact that monolithic classifier is trained as an a problem and its training set size is much bigger than the one to train H2 in the ensemble-based approach.

Taking both accuracy and training efficiency into consideration, configuration I is the best performer; it has a predictive accuracy as good as a monolithic classifier, but the training cost is 150 times less.

It will be understood that the foregoing is only illustrative of the principles of the invention, and that various modifications can be made by those skilled in the art without departing from the scope and spirit of the invention.

APPENDIX

Cost-Sensitive RIPPER ("CS-RIPPER") is a set of extensions to the RIPPER algorithm. These extensions allow for RIPPER to take into account the costs of each feature in a data set and generate a model that is sensitive to those costs. The information gain function uses the rule cost in addition to the entropy reduction when determining if feature comparisons are to be included in a rule.

The DBA2 (Distribution-Based Artificial Anomaly) algorithm referred to as method 100 herein is also a part of this package.

The DBA2 algorithm is implemented in the "curveNoise-main.c" file. The DBA2 program takes as its argument two key parameters, the data stem (from which the base data set is inferred by appending ".data" to the stem), and "N", the factor used to determine the number of artificial anomalies with which the base data set will be augmented.

Function Descriptions:
main
The "main" routine is simply responsible for checking the arguments and calling a RIPPER function to load the base data set into memory (ld_data). The data is read into a vector and passed to the "curveNoise" function.
curveNoise
The curveNoise function leverages code in the "featureStats-main.c" program, which computes the frequency of each feature value for each feature in the data set. The algorithm then operates such that data points are fabricated that are similar to randomly selected points in the base data set.
rand_example
This is a helper function for curveNoise that randomly chooses an example from the data set and permutes the value of a single feature in that example.
The complete list of routines included herewith is appended on the following pages and is incorporated by reference in its entirety herein.

| Name | Modified | Size | Ratio | Packed | Path |
|---|---|---|---|---|---|
| add-redundancy.c | Aug. 28, 1996 9:56 PM | 4,734 | 0% | 4,734 | cs-ripper\ |
| boost-main.c | Aug. 28, 1996 9:56 PM | 12,484 | 0% | 12,484 | cs-ripper\ |
| boost.c | Aug. 28, 1996 9:56 PM | 8,201 | 0% | 8,201 | cs-ripper\ |
| boost_model.c | Aug. 28, 1996 9:56 PM | 9,645 | 0% | 9,645 | cs-ripper\ |
| clean-data-main.c | Aug. 28, 1996 9:56 PM | 2,993 | 0% | 2,993 | cs-ripper\ |
| concept.c | Oct. 5, 1999 5:01 PM | 7,073 | 0% | 7,073 | cs-ripper\ |
| corrupt-main.c | Aug. 28, 1996 9:56 PM | 1,978 | 0% | 1,978 | cs-ripper\ |
| crossval.c | Aug. 28, 1996 9:56 PM | 2,410 | 0% | 2,410 | cs-ripper\ |
| data2text-main.c | Sep. 11, 1996 2:09 PM | 4,883 | 0% | 4,883 | cs-ripper\ |
| desref.c | Aug. 28, 1996 9:56 PM | 11,284 | 0% | 11,284 | cs-ripper\ |
| dougsort.c | Aug. 28, 1996 9:56 PM | 2,787 | 0% | 2,787 | cs-ripper\ |
| eliminate-main.c | Aug. 28, 1996 9:56 PM | 4,029 | 0% | 4,029 | cs-ripper\ |
| error.c | Aug. 28, 1996 9:56 PM | 1,260 | 0% | 1,260 | cs-ripper\ |
| extend-rules.c | Aug. 28, 1996 9:56 PM | 2,511 | 0% | 2,511 | cs-ripper\ |
| filter-text-main.c | Sep. 17, 1996 5:50 PM | 10,576 | 0% | 10,576 | cs-ripper\ |
| fit.c | May 6, 1999 1:58 PM | 14,962 | 0% | 14,962 | cs-ripper\ |
| gram.c | Dec. 9, 1997 10:15 AM | 8,596 | 0% | 8,596 | cs-ripper\ |
| gramaux.c | Apr. 25, 1997 11:21 AM | 9,496 | 0% | 9,496 | cs-ripper\ |
| intern.c | Sep. 11, 1996 3:36 PM | 2,916 | 0% | 2,916 | cs-ripper\ |
| lex.c | Aug. 28, 1996 9:56 PM | 7,033 | 0% | 7,033 | cs-ripper\ |
| mainaux.c | Aug. 28, 1996 9:56 PM | 491 | 0% | 491 | cs-ripper\ |
| mdb_count.c | Aug. 28, 1996 9:56 PM | 7,623 | 0% | 7,623 | cs-ripper\ |
| mdb_load.c | Aug. 30, 1996 12:56 PM | 7,746 | 0% | 7,746 | cs-ripper\ |
| mdb_names.c | Oct. 6, 1999 12:24 AM | 16,793 | 0% | 16,793 | cs-ripper\ |
| mdb_opt.c | Aug. 28, 1996 9:56 PM | 8,979 | 0% | 8,979 | cs-ripper\ |
| mdb_util.c | Aug. 28, 1996 9:56 PM | 7,287 | 0% | 7,287 | cs-ripper\ |
| mdl.c | Aug. 28, 1996 9:56 PM | 8,468 | 0% | 8,468 | cs-ripper\ |
| memory.c | Dec. 4, 1997 5:19 PM | 523 | 0% | 523 | cs-ripper\ |
| model.c | Aug. 28, 1996 9:56 PM | 5,177 | 0% | 5,177 | cs-ripper\ |
| pair-main.c | Aug. 28, 1996 9:56 PM | 2,671 | 0% | 2,671 | cs-ripper\ |
| partition-main.c | Sep. 11, 1996 1:43 PM | 2,456 | 0% | 2,456 | cs-ripper\ |
| phrases-main.c | Aug. 28, 1996 9:56 PM | 3,216 | 0% | 3,216 | cs-ripper\ |
| pprint-rules-main.c | Aug. 28, 1996 9:56 PM | 2,553 | 0% | 2,553 | cs-ripper\ |
| predict-main.c | Aug. 12, 1997 12:41 PM | 3,207 | 0% | 3,207 | cs-ripper\ |
| ripper-main.c | May 11, 1999 9:43 PM | 11,457 | 0% | 11,457 | cs-ripper\ |
| rocchio-main.c | May 6, 1999 1:51 PM | 17,457 | 0% | 17,457 | cs-ripper\ |
| rule.c | Oct. 18, 1999 11:29 PM | 1,558 | 0% | 1,558 | cs-ripper\ |
| select-class-main.c | Sep. 10, 1996 3:35 PM | 1,739 | 0% | 1,739 | cs-ripper\ |
| soft.c | Aug. 28, 1996 9:56 PM | 2,491 | 0% | 2,491 | cs-ripper\ |
| summarize-main.c | Aug. 28, 1996 9:56 PM | 9,246 | 0% | 9,246 | cs-ripper\ |
| test-rules-main.c | Aug. 28, 1996 9:56 PM | 4,500 | 0% | 4,500 | cs-ripper\ |
| time.c | Dec. 4, 1997 5:25 PM | 1,324 | 0% | 1,324 | cs-ripper\ |
| trace.c | Aug. 28, 1996 9:56 PM | 555 | 0% | 555 | cs-ripper\ |
| transform-main.c | Sep. 15, 1996 10:26 PM | 6,582 | 0% | 6,582 | cs-ripper\ |
| types.c | Aug. 28, 1996 9:56 PM | 1,322 | 0% | 1,322 | cs-ripper\ |
| value.c | Oct. 7, 1999 8:45 PM | 7,949 | 0% | 7,949 | cs-ripper\ |
| vector.c | Dec. 4, 1997 5:21 PM | 2,738 | 0% | 2,738 | cs-ripper\ |
| verify-main.c | Aug. 28, 1996 9:56 PM | 2,464 | 0% | 2,464 | cs-ripper\ |
| weak_rule.c | Aug. 28, 1996 9:56 PM | 10,486 | 0% | 10,486 | cs-ripper\ |
| boost.h | Aug. 16, 1996 5:37 AM | 1,329 | 0% | 1,329 | cs-ripper\ |
| extras.h | Feb. 10, 2000 8:52 PM | 1,854 | 0% | 1,854 | cs-ripper\ |
| mdb.h | Jun. 13, 1999 4:00 PM | 2,384 | 0% | 2,384 | cs-ripper\ |
| protos.h | Oct. 7, 1999 8:39 PM | 6,462 | 0% | 6,462 | cs-ripper\ |
| ripper.h | Jun. 13, 1999 4:01 PM | 8,350 | 0% | 8,350 | cs-ripper\ |
| soft.h | Aug. 16, 1996 5:37 AM | 1,161 | 0% | 1,161 | cs-ripper\ |
| trace.h | Aug. 16, 1996 5:37 AM | 195 | 0% | 195 | cs-ripper\ |
| vector.h | Dec. 4, 1997 5:03 PM | 6,103 | 0% | 6,103 | cs-ripper\ |
| Makefile | Dec. 21, 2001 1:13 PM | 6,342 | 0% | 6,342 | cs-ripper\ |
| featureStats-main.c | Feb. 12, 2000 7:06 PM | 5,958 | 0% | 5,958 | cs-ripper\ |
| featureStats.c | Feb. 9, 2000 3:46 PM | 5,435 | 0% | 5,435 | cs-ripper\ |
| curveNoise-main.c | Oct. 11, 2002 12:37 AM | 7,428 | 0% | 7,428 | cs-ripper\ |
| randomNoise-main.c | Feb. 11, 2000 1:07 AM | 4,674 | 0% | 4,674 | cs-ripper\ |
| curveNoise-wacky-main.c | Feb. 19, 2000 3:08 PM | 6,703 | 0% | 6,703 | cs-ripper\ |
| randFNoise-main.c | Feb. 21, 2000 2:24 PM | 6,539 | 0% | 6,539 | cs-ripper\ |
| randFNoise2-new-main.c | Feb. 22, 2000 8:33 PM | 7,497 | 0% | 7,497 | cs-ripper\ |
| randFNoise2-main.c | Feb. 23, 2000 2:36 PM | 8,207 | 0% | 8,207 | cs-ripper\ |
| dataDiff-main.c | Feb. 25, 2000 11:46 AM | 6,039 | 0% | 6,039 | cs-ripper\ |
| dataDiff | Feb. 25, 2000 11:47 AM | 415,404 | 0% | 415,404 | cs-ripper\ |
| Readme | Oct. 11, 2002 12:38 AM | 2,090 | 0% | 2,090 | cs-ripper\ |
| 69 file(s) | | 799,063 | 0% | 799,063 | |

What is claimed is:

1. A method of generating an anomaly detection model for classification of activities occurring on a computer system, comprising:
   (a) for a selected feature of a plurality of features and a selected value of said selected feature, determining a quantity corresponding to a relative sparsity of said selected value in a training set of data comprising a plurality of instances of data corresponding to activity on the computer system;
   (b) generating a plurality of instances of data classified as anomaly corresponding to said quantity determined in said determining; and
   (c) adding said plurality of instances of data generated in said generating to a training set of normal data to create a training set of normal data and anomaly data.

2. The method as recited in claim 1, wherein determining a quantity comprises, for a selected feature in said plurality of features, determining a number of occurrences of a most frequently occurring value of said selected feature.

3. The method as recited in claim 2, wherein determining a quantity comprises, for a selected value in said plurality of values, determining a number of occurrences of said selected value.

4. The method as recited in claim 3, wherein determining a quantity comprises, determining a difference between said number occurrences of said selected value and said number of occurrences of said most frequently occurring value.

5. The method as recited in claim 1, wherein generating a plurality of instances of data comprises randomly selecting an instance of data from said training data of normal data, and determining a value of a feature corresponding to said randomly selected instance of data.

6. The method as recited in claim 5, wherein generating a plurality of instances of data further comprises replacing said value of said feature corresponding to said randomly selected instance of data with a randomly selected value, wherein said randomly selected value excludes said value of said feature corresponding to said randomly selected instance of data and excludes said selected value.

7. The method as recited in claim 6, wherein generating a plurality of instances of data further comprises generating an instance of data based on said randomly selected value.

8. A method of generating an anomaly detection model for classification of activities of a computer system comprising:
   (a) for a selected feature of a plurality of features and a selected value of said selected feature, determining a quantity corresponding to a relative sparsity of said selected value;
   (b) generating a plurality of instances of data classified as anomaly data corresponding to said quantity determined in said determining;
   (c) adding said plurality of instances of data generated in said generating to a training set of normal data to create a training set of normal data and anomaly data; and
   (d) generating an anomaly detection model from said training set of normal data and anomaly data.

9. The method as recited in claim 8, wherein determining a quantity comprises, for a selected feature in said plurality of features, determining a number of occurrences of a most frequently occurring value of said selected feature.

10. The method as recited in claim 9, wherein determining a quantity comprises, for a selected value in said plurality of values, determining a number of occurrences of said selected value.

11. The method as recited in claim 10, wherein determining a quantity comprises, determining a difference between said number occurrences of said selected value and said number of occurrences of said most frequently occurring value.

12. A method of generating an anomaly detection model for classification of activities occurring on a computer system comprising:
   (a) for a selected feature of a plurality of features and a selected value of said selected feature, determining a quantity corresponding to a relative sparsity of said selected value in a training set of data comprising a plurality of instances of data corresponding to activity on the computer system;
   (b) generating a plurality of instances of data classified as anomaly corresponding to said quantity determined in said determining using the RIPPER algorithm; and
   (c) adding said plurality of instances of data generated in said generating to a training set of normal data to create a training set of normal data and anomaly data.

13. The method of claim 12, wherein generating an anomaly detection model comprises generating a plurality of unordered rulesets.

14. The method as recited in claim 13, wherein generating a plurality of instances of data comprises randomly selecting an instance of data from said training set of normal data, and determining a value of a feature corresponding to said randomly selected instance of data.

15. The method as recited in claim 14, wherein generating a plurality of instances of data further comprises replacing said value of said feature corresponding to said randomly selected instance of data with a randomly selected value, wherein said randomly selected value excludes said value of said feature corresponding to said randomly selected instance of data and excludes said selected value.

16. The method as recited in claim 15, wherein generating a plurality of instances of data further comprises generating an instance of data based on said randomly selected value.

17. A method of generating an anomaly detection model for classification of activities of a computer system comprising:
   (a) for a first selected feature of said plurality of features and a first selected value of said first selected feature, determining a first quantity corresponding to a relative sparsity of said first selected value;
   (b) generating a first plurality of instances of data classified as anomaly data corresponding to said first quantity determined in said determining a first quantity;
   (c) adding said first plurality of instances of data generated in said generating a first plurality of instances of data to a training set of normal data to create a first training set of normal data and anomaly data;
   (d) generating an anomaly detection model from said training set of normal data and anomaly data
   (e) for a second selected feature of said plurality of features and a second selected value of said second selected feature, determining a second quantity corresponding to a relative sparsity of said second selected value;
   (f) generating a second plurality of instances of data classified as anomaly data corresponding to said second quantity determined in said determining a second quantity;
   (g) adding said second plurality of instances of data generated in said generating a second plurality of instances of data to said first training set of normal data and anomaly data to create a second training set of normal data and anomaly data.

18. The method of claim 17, wherein the second selected feature comprises a cluster of features.

19. The method of claim 17, further comprising generating an anomaly detection model from said second training set of normal data and anomaly data.

20. A method of generating an anomaly detection model for classification of activities of a computer system comprising:
  (a) for a first selected feature of said plurality of features and a first selected value of said first selected feature, determining a first quantity corresponding to a relative sparsity of said first selected value;
  (b) generating a first plurality of instances of data classified as anomaly data corresponding to said first quantity determined in said determining a first quantity;
  (c) adding said first plurality of instances of data generated in-said generating a first plurality of instances of data to a training set of normal data to create a first training set of normal data and anomaly data;
  (d) generating an anomaly detection model from said training set of normal data and anomaly data using the RIPPER algorithm;
  (e) for a second selected feature of said plurality of features and a second selected value of said second selected feature, determining a second quantity corresponding to a relative sparsity of said second selected value;
  (f) generating a second plurality of instances of data classified as anomaly data corresponding to said second quantity determined in said determining a second quantity;
  (g) adding said second plurality of instances of data generated in said generating a second plurality of instances of data to said first training set of normal data and anomaly data to create a second training set of normal data and anomaly data.

\* \* \* \* \*